United States Patent
Hilton et al.

(10) Patent No.: US 7,230,266 B2
(45) Date of Patent: Jun. 12, 2007

(54) CONDITIONAL RABI OSCILLATION READOUT FOR QUANTUM COMPUTING

(75) Inventors: Jeremy P. Hilton, Vancouver (CA); Geordie Rose, Vancouver (CA); Brock Wilson, Vancouver (CA); Anatoly Yu. Smirnov, Vancouver (CA)

(73) Assignee: D-Wave Systems Inc., Vancouver (CA)

( * ) Notice: Subject to any disclaimer, the term of this patent is extended or adjusted under 35 U.S.C. 154(b) by 223 days.

(21) Appl. No.: 10/845,638

(22) Filed: May 14, 2004

(65) Prior Publication Data

US 2005/0001209 A1 Jan. 6, 2005

Related U.S. Application Data

(60) Provisional application No. 60/471,107, filed on May 15, 2003, provisional application No. 60/480,067, filed on Jun. 20, 2003.

(51) Int. Cl.
*H01L 39/22* (2006.01)
(52) U.S. Cl. .......................................... 257/31; 977/933
(58) Field of Classification Search .................... 257/31
See application file for complete search history.

(56) References Cited

U.S. PATENT DOCUMENTS

2002/0117738 A1\* 8/2002 Amin et al. ................ 257/663
2002/0188578 A1 12/2002 Amin et al.
2004/0077503 A1 4/2004 Blais et al.

OTHER PUBLICATIONS

Smirnov A. Y., Physical Review B, 67, 155104 Apr. 11, 2003 "Decoherence . . . Rabi oscillations".\*
U.S. Appl. No. 60/480,067, Hilton et al.
Averin, D.V., 2002, "Quantum Nondemolition Measurements of a Qubit," Phys. Rev. Lett. 88, 207901.
Chiorescu, I., Y. Nakamura, C.J.P.M. Harmans, J.E. Mooij, 2003, "Coherent Quantum Dynamics of a Superconducting Flux Qubit," Science 299, 1869.
Clarke, J., A.N. Cleland, M.H. Devoret, D. Esteve, J.M. Martinis, 1988, "Quantum Mechanics of a Macroscopic Variable: The Phase Difference of a Josephson Junction," Science 239, 992.
Cottet, A., D. Vion, A. Aassime, P. Joyez, D. Esteve, M.H. Devoret, 2002, "Implementation of a combined charge-phase quantum bit in a superconducting circuit," Physica C 367, pp. 197-203.
Deutsch, D., "Quantum theory, the Church-Turing principle and the universal quantum computer," Proceedings of the Royal Society of London A 400, pp. 97-117.
Feynman, R., 1982, "Simulating Physics with Computers," International Journal of Theoretical Physics 21, pp. 467-488.
Hu, X., R. de Sousa, S. Das Sarma, 2001, "Decoherence and dephasing in spin-based solid state quantum computers," arXiv.org:cond-mat/0108339.
Il'ichev, E., N. Oukhanski, A. Izmalkov, T. Wagner, M. Grajcar, H.G. Meyer, A.Y. Smirnov, A. Maassen van den Brink, M.H.S. Amin, A.M. Zagoskin, 2003, "Continuous Observation of Rabi Oscillation in a Josephson Flux Qubit," arXiv.org:cond-mat/0303433.

(Continued)

*Primary Examiner*—Jerome Jackson
(74) *Attorney, Agent, or Firm*—Seed IP Law Group PLLC

(57) ABSTRACT

A method for determining whether a first state of a quantum system is occupied is provided. A driving signal is applied to the system at a frequency corresponding to an energy level separation between a first and second state of the system. The system produces a readout frequency only when the first state is occupied. A property of a measurement resonator that is coupled to the quantum system is measured when the quantum system produces the readout frequency, thereby determining whether the first state of the quantum system is occupied. A structure for detecting a qubit state of a qubit is provided. The structure comprises a quantum system that includes the qubit. The qubit has first and second basis states and an ancillary quantum state. The ancillary quantum state can be coupled to the first or second basis states. The structure has a measurement resonator configured to couple to Rabi oscillations between (i) one of the first and second basis states and (ii) the ancillary state in the quantum system.

47 Claims, 11 Drawing Sheets

OTHER PUBLICATIONS

Korotkov, A.N., 1999, "Continuous quantum measurement of a double dot," Phys. Rev. B 60, p. 5737-5742.

Korotkov, A.N., 2001, "Selective quantum evolution of a quibit state due to continuous measurement," Phys. Rev. B 63, 115403.

Leggett, A.J., S. Chakravarty, A.T. Dorsey, M.P.A. Fisher, A Garg, W. Zwerger, 1987, "Dynamics of the dissipative two-state system," Rev. Mod. Phys. 59, p. 1.

Maassen van den Brink, A., 2002, "Quantum efficient charge detection using a single-electron transistor," Europhys. Lett. 58, pp. 562-568.

Martinis, J.M., S. Nam, J. Aumentado, 2002 Rabi Oscilllations in a Large Josephson-Junction Qubit Phys. Rev. Lett. 89, 117901.

Mooij, J.E., T.P. Orlando, L. Levitov, L. Tian, C.H. van der Wal, S. Lloyd, 1999, "Josephson Persistent-Current Qubit," Science 285, 1036.

Nakamura, Y., Y.A. Pashkin, J.S. Tsai, 1999, "Coherent control of macroscopic quantum states in a single-Cooper-pair box," Nature 398, 786.

Nielsen, M.A., I.L. Chuang, 2000, *Quantum Computation and Quantum Information*, Cambridge University Press, Cambridge, UK, pp. 16-17, 188-193.

Oukhanski, N., M. Grajcar, E. Il'ichev, H.G. Meyer, 2003, "Low noise, low power consumption high electron mobility transistors amplifier, for temperature below 1 K," Rev. Sci. Instr. 74, pp. 1145-1146.

Vion, D., A. Aassime, A. Cottet, P. Joyez, H. Pothier, C. Urbina, D. Esteve, M.H. Devoret, 2002, "Manipulating the Quantum State of an Electrical Circuit," Science 296, 886.

Weiss, U., 1999, *Quantitative Dissipative Systems*, $2^{nd}$ ed., World Scientific, Singapore, pp. 164-174.

Zhou, X., Z. Zou, G. Guo, M.J. Feldman, 2002, "Quantum Computation with Untunable Coupling," Phys. Rev. Lett. 89, 197903.

Zurek, W.H., 1991, "Decoherence and the Transition from Quantum to Classical," Physics Today 44, p. 36.

* cited by examiner

CONDITIONAL RABI OSCILLATION READOUT FOR QUANTUM COMPUTING

CROSS-REFERENCE TO RELATED APPLICATIONS

This application claims benefit, under 35. U.S.C. § 119(e), of U.S. Provisional Patent Application No. 60/471,107 filed on May 15, 2003, and U.S. Provisional Patent Application No. 60/480,067 filed on Jun. 20, 2003, each of which is incorporated herein, by reference, in its entirety.

FIELD OF THE INVENTION

The invention relates to the field of quantum computing, and particularly to superconducting quantum computing.

BACKGROUND

Research on what is now called quantum computing was noted by Richard Feynman. See Feynman, 1982, International Journal of Theoretical Physics 21, pp. 467-488. Feynman observed that quantum systems are inherently difficult to simulate with conventional computers but that observing the evolution of an analogous quantum system could provide an exponentially faster way to solve the mathematical model of a system. In particular, solving a model for the behavior of a quantum system commonly involves solving a differential equation related to the Hamiltonian of the quantum system. David Deutsch observed that a quantum system could be used to yield a time savings, later shown to include exponential time savings, in certain computations. If one had a problem, modeled in the form of an equation that represented the Hamiltonian of the quantum system, the behavior of the system could provide information regarding the solutions to the equation. See Deutsch, 1985, Proceedings of the Royal Society of London A 400, pp. 97-117.

A quantum bit or "qubit" is the building block of a quantum computer in the same way that a conventional binary bit is a building block of a classical computer. The conventional binary bit always adopts the values 0 and 1, which can be termed the "states" of a conventional bit. A qubit is similar to a conventional binary bit in the sense that it can adopt states, called "basis states". The basis states of a qubit are referred to as the |0> basis state and the |1> basis state. During quantum computation, the state of a qubit is defined as a superposition of the |0> basis state and the |1> basis state. This means that the state of the qubit simultaneously has a nonzero probability of occupying the |0> basis state and a nonzero probability of occupying the |1> basis state. The ability of a qubit to have a nonzero probability of occupying a first basis state |0> and a nonzero probability of occupying a second basis state |1> is different from a conventional bit, which always has a value of 0 or 1.

Qualitatively, a superposition of basis states means that the qubit can be in both basis states |0> and |1> at the same time. Mathematically, a superposition of basis states means that the overall state of the qubit, which is denoted $|\psi\rangle$, has the form $$|\psi\rangle = a|0\rangle + b|1\rangle$$

where a and b are coefficients respectively corresponding to probability amplitudes $|a|^2$ and $|b|^2$. The coefficients a and b each have real and imaginary components, which allows the phase of qubit to be modeled. The quantum nature of a qubit is largely derived from its ability to exist in a superposition of basis states, and for the state of the qubit to have a phase.

To complete a computation using a qubit, the state of the qubit must be measured (e.g., read out). When the state of the qubit is measured the quantum nature of the qubit is temporarily lost and the superposition of basis states collapses to either the |0> basis state or the |1> basis state, thus regaining its similarity to a conventional bit. The actual state of the qubit after it has collapsed depends on the probability amplitudes a and b immediately prior to the readout operation.

It has been observed that these requirements for a quantum computer are met by physical systems that include superconducting materials. Superconductivity is a phenomena that permits the flow of current without impedance, and therefore without a voltage difference. Systems that are superconducting have a superconducting energy gap that suppresses potentially decohering excitations, leading to increased decoherence times. Decoherence is the loss of the phases of quantum superpositions in a qubit as a result of interactions with the environment. Thus, decoherence results in the loss of the superposition of basis states in a qubit. See, for example, Zurek, 1991, Phys. Today 44, p. 36; Leggett et al., 1987, Rev. Mod. Phys. 59, p. 1; Weiss, 1999, Quantitative Dissipative Systems, $2^{nd}$ ed., World Scientific, Singapore; Hu et al; arXiv:cond-mat/0108339, which are herein incorporated by reference in their entireties. Many superconducting structures that include Josephson junctions have been shown to support universal quantum gates. For information on universal quantum gates, see Nielsen and Chuang, *Quantum Computation and Quantum Information*, Cambridge University Press, 2000, as reprinted in 2002. A major challenge to the realization of scalable superconducting qubits is that the requirement for measurement often leads to coupling with decohering sources of noise. The properties of superconducting structures that permit long decoherence times serve to isolate the qubit making qubit measurement more laborious.

Current Biased Josephson Qubit

Numerous examples of qubit-specific measurement systems, also called readout systems, exist in the art. The current biased Josephson junction qubit (CBJJ), is an example of a superconducting qubit with a corresponding measurement scheme. An example of a qubit specific measurement system is observation of a voltage state. See Martinis et al., 2002, Phys. Rev. Lett. 89, p. 117901 which is hereby incorporated by reference in its entirety. The CBJJ is a Josephson junction having dimensions of about 10 microns square that is current biased to just below its critical current. Under the influence of the bias current the CBJJ forms a tilted washboard potential with local minima, each minima containing quantized energy levels. The CBJJ has two basis states denoted as |0> and |1>. Each basis state comprises a quantized energy level. The state of the CBJJ can be a superposition of these states. Because of this property, the CBJJ basis states can be used for quantum computation. The measurement scheme is realized by providing a third basis state |2>. Assuming the CBJJ is in the |1> basis state, a Rabi flop is used to induce a transition from the |1> basis state to the |2> basis state. The Rabi flop exchanges the probability amplitude of state |1> for the probability amplitude of state |2>. Thus, if the CBJJ was in state $|\psi_{pre}\rangle = a|0\rangle + b|1\rangle + 0|2\rangle$ before the Rabi flop, the CBJJ will be in the final state $|\psi_{post}\rangle = a|0\rangle + 0|1\rangle + b|2\rangle$, where b has flopped from state |1> to state |2>.

An important property for this measurement scheme is that the |2> basis state differs from |0> and |1> in that it has a large probability of transition to voltage state (e.g. non-superconducting state). The voltage state is measured as a potential difference across the Josephson junction, and information about the state of the qubit can be inferred. If a voltage is measured the CBJJ must have been in state |1> because the measurement process included transitions from state |1> to state |2>. The observation of a voltage across the CBJJ is a central aspect to readout for all qubits using CBJJs. A detrimental consequence of measurement of the voltage is that the CBJJ becomes excited and effectively heated, such that it must be allowed some relaxation time before being re-initialized.

Quantronium

Another example of a qubit-specific measurement system is the phase readout of hybrid qubits. A hybrid qubit is a qubit that has neither a charge nor a phase as a good quantum number. By way of background, the uncertainty in the charge and the phase of a qubit is determined by the Heisenberg uncertainty principle. This principle can be expressed as $\Delta n \Delta \phi \geq \frac{1}{2}$, where $\Delta n$ represents an uncertainty in the charge of the qubit and $\Delta \phi$ represents an uncertainty in the phase of the qubit. There are two classic types of qubits, charge qubits and phase qubits. In a charge qubit, the uncertainty of the phase of the qubit is large compared to the uncertainty of the charge. In a phase qubit, uncertainty of the charge of the qubit is large compared to the uncertainty of the phase. When a qubit is in the charge regime, the charge of the charge device represents a good quantum number and has a finite number of charge states. A good quantum number in this case means a small uncertainty in its charge. See, e.g., Nakamura et al., 1999, Nature 398, p. 786, which is hereby incorporated by reference. When a qubit is in the phase regime, the phase of a mesoscopic phase device is a good quantum number (to the extent that the uncertainty is small) having a finite number of phase states.

The quantronium comprises a small-capacitance mesoscopic superconducting island of a charge qubit that is connected to two Josephson junctions. The basis states of the small-capacitance mesoscopic superconducting island, and therefore the behavior of the current through the island (called the current phase relationship), are related to the charge states of the island. The small-capacitance mesoscopic superconducting island is incorporated into a loop, also containing a large Josephson junction operating in the classical (non-quantum) regime. When combined in this loop configuration, the classical Josephson junction has a critical current produced across the junction. A critical current is the minimum current across the junction that will achieve a voltage. The magnitude of this critical current depends on the state of the mesoscopic island. In other words, the minimum current across the junction that will achieve a voltage will depend on the basis state of the mesoscopic island. Since there are two possible basis states, there are two possible critical currents, denoted $I_{c0}$ and $I_{c1}$. The critical currents $I_{c0}$ and $I_{c1}$ respectively correspond to the qubit basis states |0> and |1>. The two critical currents have different amplitudes.

If the loop is biased by an external current having a magnitude halfway between $I_{c0}$ and $I_{c1}$, the classical junction will enter the voltage state if the qubit occupies the state corresponding to the lesser critical current value. See Cottet et al., 2002, Physica C 367, pp. 197-203 and Vion et al., 2002, Science 296, pp. 886, and the references therein, which are hereby incorporated by reference in their entireties. A similar readout scheme has also been proposed. See U.S. patent application Ser. No. 09/872,495 entitled "Quantum Processing System for a Superconducting Phase Qubit", filed Jun. 6, 2001, which is hereby incorporated by reference in its entirety. One drawback with the quantronium is that, like other known readout mechanisms, the qubit must be set into a voltage state in order to produce the readout. This voltage state is undesirable, as discussed in more detail below, because it introduces a source of decohering heat into the quantum computing system.

Three-Junction Flux Qubit

Another example of a qubit-specific measurement system is the switching-event measurement of the dc-SQUID readout of flux qubits. See Chiorescu et al., 2003, Science 299, p. 1869. A flux qubit is a type of phase qubit that has a substantial magnetic flux associated with each basis state. One flux qubit is the 3-junction qubit designed by researchers at the Massachusetts Institute of Technology in the U.S.A. and Technische Universiteit Delft in the Netherlands. The 3-junction flux qubit consists of three Josephson junctions arranged in a superconducting loop threaded by an externally applied magnetic flux. In a particular region of flux bias the potential energy profile of the flux qubit has two wells. Varying the flux bias controls the shape of the double well potential and the energy level separation of this qubit. The 3-junction flux qubit can be engineered such that the two lowest eigenstates are energetically separated from the higher ones. One of these low lying energy levels is in the left well and the other is in the right and they form the basis states of the qubit. Measurement of the 3-junction flux qubit can be achieved by coupling the flux qubit to an underdamped dc-SQUID. A bias current pulse $I_B$ is applied to the dc-SQUID. The $I_B$ pulse consists of a short pulse of length of about 50 nanoseconds followed by a long pulse of about 500 nanoseconds. During the short pulse, the dc-SQUID is operating near its critical current. The flux from the flux qubit induces a current in the dc-SQUID that either reinforces or cancels the bias current. Therefore the dc-SQUID either switches to the voltage state or remains in a superconducting state. The pulse height and duration are set to optimize the distinction of the switching probability between the two qubit states. Readout using a switching-event measurement of a dc-SQUID reveals quantum-state oscillations with high fidelity. However, the readout involves a transition to the voltage state of the dc-SQUID. Furthermore, the dc-SQUID is underdamped so it takes some time to return to a superconducting state.

Existing Direct Measurement Readout Schemes

A number of direct measurement readout schemes have been described. Each of these schemes require a qubit to transition to a voltage state or the use of an associated measurement device such as a Josephson junction or dc-SQUID. While such measurement techniques are functional they are unsatisfactory because they impose difficulties that impair effective quantum computing. Effective quantum computing requires both scalability of qubits and fast qubit readout times.

In particular, measurement techniques that require a qubit to enter a voltage state impose an unsatisfactory constraint on the readout time of a qubit. This is because it takes a substantial amount of time for a qubit to return to a superconducting state after the qubit has transitioned into a voltage state. For example, the hybrid qubit and large Josephson junction system remain in the voltage state for about 100 microseconds. This is an undesirable amount of time. A more desirable measurement time is on the order of 1 nanosecond. Another problem with a readout approach that depends on the qubit voltage state is that, as a result of the heating caused by the voltage state, surrounding parts of the quantum system, such as neighboring qubits, are adversely affected (e.g. exposed to decohering thermal effects). Because of these drawbacks in all the direct measurement readout mechanisms discussed above, the use of the phenomena of transitioning the qubit to a voltage state as a form of qubit direct measurement is viable for a single qubit only, not arrays of coherently connected qubits that would be found in a quantum computer.

Weak Measurement Readout Systems

In addition to the direct readout mechanisms described above, there exist weak link measurement systems. For example, recently, experiments on a system that provides for weak measurement of a three-junction flux qubit have been described. See Il'ichev et al., March 2003, "Continuous Observation of Rabi Oscillations in a Josephson Flux Qubit," arXiv:cond-mat/0303433, which is hereby incorporated by reference in its entirety. As is well known in the field of quantum mechanics, a weak measurement provides a probabilistic result, hence only partially collapsing the state of the qubit being measured. In particular, a weak measurement has a non-trivial error rate and is implemented via a weak coupling of the qubit and the measurement apparatus. In the case of Il'ichev et al., the qubit is weakly coupled to a measurement resonator. Weak measurements are known and described in the art. See, for example, Averin, 2002, Physical Review Letters 88, p. 201901; Maassen van den Brink, 2002, Europhysics Letters 58, pp. 562-568; Korotkov, 2001, Physical Review B 63, p. 115403; and Korotkov, 1999, Physical Review B 60, p. 5737-5742, each of which is hereby incorporated by reference in its entirety.

In Il'ichev, a high frequency (e.g., microwave) that is in resonance with the spacing between at least two of the three-junction flux qubit's energy levels is applied thereby causing the energy level occupation properties of the qubit to oscillate with a frequency proportional to the amplitude of the applied high frequency. Such oscillation in the qubit energy levels is termed Rabi oscillations. Using the system described by Il'ichev, which includes a three-junction flux qubit and a tank circuit, the Rabi frequency $\Omega_R$ of the Rabi oscillations can be tuned to coincide with the resonance frequency of the weakly coupled measurement resonator, such that the three-junction flux qubit and the tank circuit become coupled through the Rabi oscillations. By monitoring the properties of the tank circuit and performing a spectral analysis on the output, Il'ichev et al. demonstrated that the three-junction flux qubit underwent coherent Rabi oscillations. In the experiments described by Il'ichev et al., the coupling between the qubit and tank circuit was designed to be weak so that the tank circuit would not substantially decohere the qubit when it was coupled to the qubit.

The Il'ichev et al. device permits a form of weak measurement of the qubit. However, because weak measurement techniques are used, the time required to obtain sufficient information about the state of the qubit is too long to be useful for quantum computing. Furthermore, the resulting spectroscopic data obtained by Il'ichev et al. is not sufficient to determine the state of the qubit, but rather only the characteristics (e.g., the energy differential between qubit basis states) of the qubit.

Given the above background, what is needed in the art are improved systems and methods for implementing measurement of the state of qubits (readout). Such systems and methods are necessary in order to provide devices that perform as readout devices that possess all the requirements necessary to perform quantum computing. However, for the reasons discussed above, such devices should not decohere or heat the qubit or measurement device.

BRIEF DESCRIPTION OF THE DRAWINGS

Like reference numerals refer to corresponding parts throughout the several views of the drawings.

SUMMARY OF THE INVENTION

Figure 1:
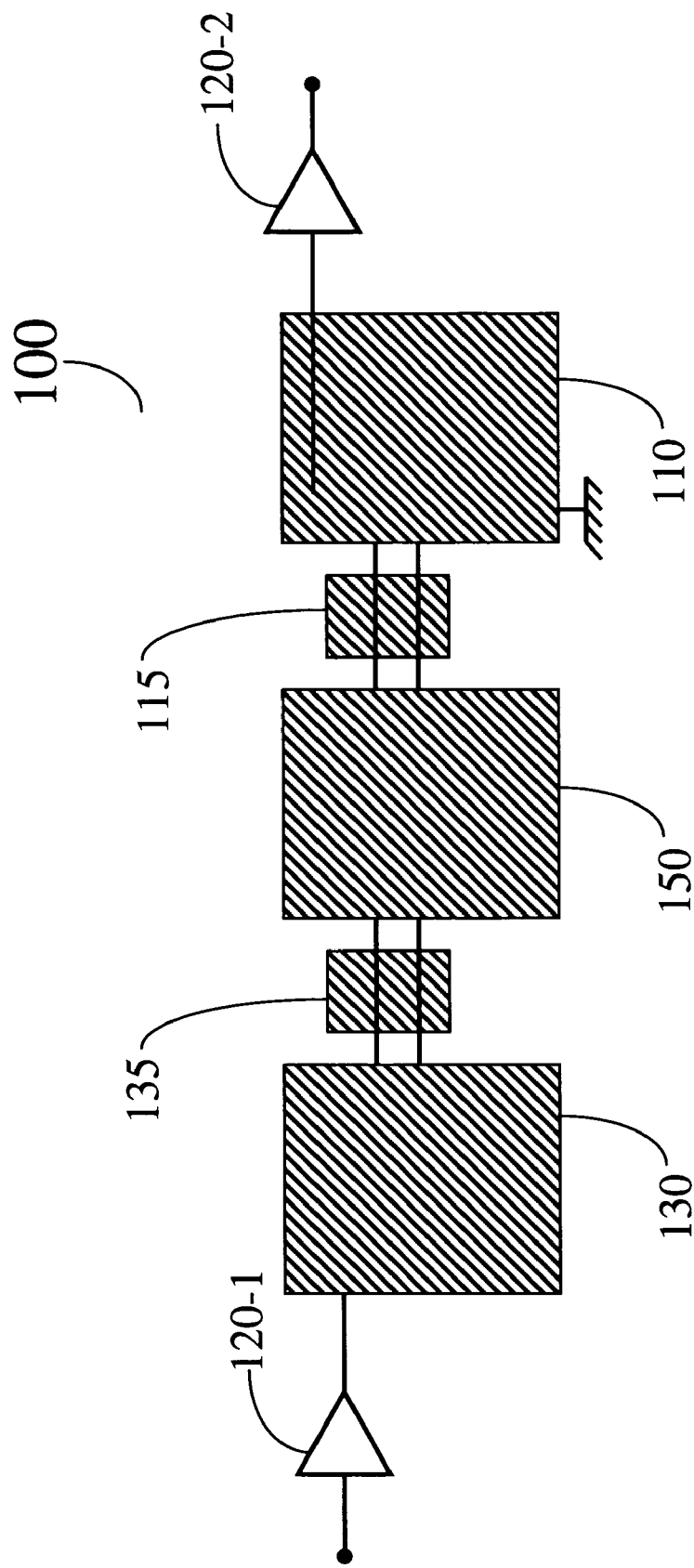
FIG. 1 illustrates an apparatus for determining the quantum state of a quantum system in accordance with one embodiment of the present invention.

One aspect of the invention provides a method for determining whether a first state of a quantum system is occupied. In the method, a driving signal is applied to the quantum system at a frequency that approximates an energy level separation between a first state and a second state of the quantum system such that (i) the quantum system produces a readout frequency when the first state is occupied at a time of measurement of the quantum system and (ii) the quantum system does not produce the readout frequency when the first state is not occupied at a time of measurement of the quantum system. The method continues with measurement of a property, such as impedance, of a resonator that is coupled to the quantum system when the quantum system produces the readout frequency, thereby determining whether the first state of the quantum system is occupied. In some embodiments, the measurement resonator is capacitively or inductively coupled to the quantum system when the quantum system produces the readout frequency.

In some embodiments, the energy level separation between the first state and the second state of the quantum system is between 400 megaHertz (MHz) and 50 gigaHertz (GHz). In some embodiments, the driving signal comprises an alternating signal and, optionally, a DC bias signal. In some instances, the alternating signal comprises an alternating current, an alternating voltage, or an alternating magnetic field.

In some embodiments (i) the measurement resonator is capacitively or inductively coupled to the quantum system when the quantum system produces the readout frequency and (ii) is not capacitively or inductively coupled to the quantum system when the quantum system does not produce the readout frequency. In such embodiments, the property of the measurement resonator is determined by the presence or absence of coupling between the quantum system and the measurement resonator.

In some embodiments, the quantum system is a qubit having a first energy level, a second energy level, and a third energy level. The first energy level and the second energy level respectively correspond to a first basis state and a second basis state of the qubit. In such embodiments, the first state is the first basis state or the second basis state of the qubit. Further, the second state is a third energy level of the qubit. The qubit produces a readout frequency when:

(i) a driving signal has a frequency that corresponds to an energy level separation between the first state (first or second basis state) of the qubit and the second state (third energy level) of the qubit, and (ii) at least one of the first state of the qubit and the second state of the qubit is occupied at a time when the driving signal is applied.

In some embodiments, the energy separation between the first basis state of the qubit and the third energy level of the qubit is different from the energy separation between the second basis state of the qubit and the third energy level of the qubit. Further, in some embodiments, the frequency of the driving signal corresponds to the energy level separation between the second basis state of the qubit and the third energy level of the qubit such that (i) an absence of the readout frequency when the driving signal is applied means that the qubit occupies the first basis state, and (ii) a presence of the readout frequency when the driving signal is applied means that the qubit occupies the second basis state. In some embodiments, the frequency of the driving signal corresponds to the energy level separation between the first basis state of the qubit and the third energy level of the qubit such that (i) an absence of the readout frequency when the driving signal is applied means that the qubit occupies the second basis state and (ii) a presence of the readout frequency when the driving signal is applied means that the qubit occupies the first basis state.

Another aspect of the invention provides a structure for detecting a state of a qubit. The structure comprises a quantum system that includes the qubit. The qubit comprises a first basis state, a second basis state, and an ancillary quantum state. The ancillary quantum state can be coupled to the first or second basis state. The structure further comprises a measurement resonator, that is configured to couple to Rabi oscillations between (i) one of the first basis state and the second basis state and (ii) the ancillary state in the quantum system. The structure further comprises a control mechanism for applying a driving signal to the quantum system that is equivalent to an energy difference between (i) one of the first basis state and the second basis state and (ii) the ancillary state. In some embodiments, the qubit is a superconducting qubit, such as, for example, a flux qubit, a charge qubit, a phase qubit, or a hybrid qubit.

DETAILED DESCRIPTION

In accordance with the present invention, a system for performing a conditional Rabi readout operation comprises a quantum system, a mechanism for controlling the quantum system, and a measurement resonator having a characteristic resonance frequency. The quantum system couples to the measurement resonator when the quantum system is driven to produce a frequency that corresponds to the characteristic resonance frequency of the measurement resonator. In some embodiments of the present invention, the quantum system is a qubit which is a building block for quantum computation. A mechanism for controlling the quantum system comprises a device for applying a suitable direct current (DC) bias signal and one or more alternating signals having a frequency that matches the characteristic frequencies of the quantum system. Characteristic frequencies of the quantum system correspond to the separation between energy levels. For example, the frequency $\omega_{ij} = \Delta E_{ij}/\hbar$ corresponds to the energy difference between the $i^{th}$ and $j^{th}$ energy levels, where $\hbar$ is Planck's constant divided by $2\pi$.

FIG. 1 illustrates an apparatus 100 for determining the quantum state of a system in accordance with one embodiment of the present invention. Apparatus 100 comprises quantum system 150, control mechanism 130 for controlling quantum system 150, measurement resonator 110, connections 135 and 115, signal input device 120-1, and signal output device 120-2. In some embodiments, quantum system 150 is a superconducting qubit, such as a charge, flux or phase qubit.

Quantum system 150 is characterized by discrete energy levels that can be used for storing and processing information. In some embodiments of the present invention, the ground and first excited energy levels of quantum system 150 form the basis states of a qubit. In some embodiments of the present invention, quantum system 150 comprises a third energy level that can be used to perform a conditional readout operation in order to obtain information about the state of quantum system 150.

Control mechanism 130 comprises a mechanism for delivering an alternating signal and a suitable DC bias signal to quantum system 150. The frequency of the alternating signal corresponds to the separation $\Delta E_{ij}$ between the $i^{th}$ and $j^{th}$ energy levels of quantum system 150. In some embodiments, an Anritsu MP1758A or an Agilent E8257C signal generator is used to apply the alternating signal.

The characteristics of the DC bias signal that is applied in the various embodiments of the present invention are application specific. In some embodiments, the DC bias signal is a voltage bias. In such embodiments, a broad range of bias voltages can be used, such as, for example, between 0.01 microVolts and 1000 microVolts. In other embodiments, a narrower range of bias voltages is used, such as, for example, 0.1 microVolts to 100 microVolts. In some embodiments of the present invention, the DC bias signal is a magnetic field bias or a current bias rather than a voltage bias. In embodiments of the present invention, the DC bias signal is used to make the frequency of Rabi oscillations that are induced in the quantum system comparable to the resonant frequency of the measurement resonator. The DC bias signal is also used to make the Rabi oscillations have a measurable affect on a property of the measurement resonator. As such, the type of DC bias signal and the magnitude of the DC bias signal that is used along with the alternating signal will depend upon the characteristics of the quantum system that is being used. Not all quantum systems require a DC bias signal. For example, in instances where quantum system 150 comprises qubits that make use of atomic energy levels of a neutral species (e.g. an atom) to represent basis states, a DC bias signal is not needed. Thus, the DC bias signal is optional in the sense that, for some quantum systems within the scope of the present invention, the DC bias signal is simply not needed in order to determine the state of the quantum system. The DC bias signal can be applied using techniques that are well known in the prior art. For example, a low noise power supply can be used to apply the signal.

Measurement resonator 110 comprises a structure that has a characteristic resonance frequency, denoted $\omega_T$, that can interact with quantum system 150. In an embodiment of the present invention, measurement resonator 110 comprises a structure having an inductance and a capacitance, such that measurement resonator 110 is characterized by a resonance frequency. In some embodiments of the present invention, measurement resonator 110 is a tank circuit, comprising an inductor and a capacitor, having a characteristic resonant frequency $\omega_T = 1/\sqrt{L_T \cdot C_T}$, where $L_T$ is the inductance and $C_T$ is the capacitance of the tank circuit. In some embodiments of the present invention, the characteristic resonance frequency of measurement resonator 110 is an order of magnitude different from the characteristic frequencies in quantum system 150.

In some embodiments of the present invention, measurement resonator 110 has a characteristic resonance frequency in the range 1-300 MHz, and quantum system 150 has characteristic frequencies in the range 500 MHz to 50 GHz. Thus, typically, there is no overlap between the characteristic resonance frequency of measurement resonator 110 and the characteristic frequencies of quantum system 150. Thus, typically, quantum system 150 and measurement resonator 110 do not couple.

In some embodiments, measurement resonator 110 has a quality factor, denoted Q, between 500 and 5000. The quality factor for measurement resonator 110 is defined as the ratio of the resonance frequency of the resonator to the spectral width (full width half maximum) of a resonance response curve for the resonator. The quality factor of measurement resonator can be temperature dependent. One instance of the present invention includes a measurement resonator 110 that has a quality factor of 500 at 4.2 Kelvin (K) and a quality factor of 1500 at 1 K. In some embodiments of the present invention, the quality factor of measurement resonator 110 is between 800 and 10,000 at temperatures below 5 K. In other embodiments the quality factor of measurement resonator is between 1,200 and 2,400 at temperatures below 5 K. In one embodiment of the present invention, the quality factor of measurement resonator 110 is 2,000 at temperatures below 1 K.

In some embodiments of the present invention, the inductor in measurement resonator 110 is made from superconducting material. Measurement resonator 110 is typically made from components that are placed on a common substrate (e.g., a chip) using standard semiconductor processing techniques that are disclosed in, for example, Van Zant, *Microchip Fabrication*, Fourth Edition, 2000, McGraw-Hill, New York, N.Y.; *Microlithography, Micromachining, and Microfabrication*, Rai-Chaudhury, ed., SPIE Optical Engineering Press, 1977, Bellingham, Wash.; and Madoy, *Fundamentals of Microfabrication*, Second Edition, 2002, CRC Press, Boca Roton, Fla. In some embodiments of the present invention, however, measurement resonator 110 comprises both on-chip and off-chip components. For example, the capacitance of measurement resonator 110 can be off-chip. In some embodiments, measurement resonator 110 is integrated on-chip together with quantum system 150.

In some embodiments of the present invention, connection 115 is used to couple quantum system 150 to measurement resonator 110. In some embodiments, connection 115 is capacitive and/or inductive. Connection 135 permits control mechanism 130 to interact with control quantum system 150. Connection 135 can be capacitive or inductive, for example. In some embodiments, input device 120-1 comprises a signal attenuator in which an input signal is controlled to avoid decohering effects on the quantum system.

Devices that can serve as input device 120-1 and output device 120-2 are well known in the field of low temperature electronics. In some embodiments, an Anritsu MP1758A or an Agilent E8257C is used as an input device 120-1 in order to apply an alternating signal. In some embodiments of the present invention, output device 120-2 comprises a low temperature amplifier. See, for example, Oukhanski et al., 2003, Review of Scientific Instruments 74, p. 1145, which is hereby incorporated by reference in its entirety. In some embodiments of the invention, output device 120-2 is a cold amplifier, operating at about 300 milli-Kelvin (mK). In some embodiments, 120-2 is a low temperature amplifier, such as the amplifier described in Oukhanski et al., Review of Scientific Instruments 74, pp. 1145-1146, 2003, coupled to a standard room temperature amplifier. In some embodiments, the amplified signal is measured using an Agilent 4396B spectrum analyzer. In some embodiments of the present invention, one or both of the input device 120-1 and output device 120-2 are integrated on-chip with quantum system 150.

The present invention provides a method for performing a readout operation of the state of a quantum system using a measurement resonator, having a characteristic resonance frequency, and a control mechanism for controlling the quantum system. The quantum system is driven to produce a readout frequency that corresponds to the characteristic resonance frequency of the measurement resonator. This results in the coupling of the measurement resonator and the quantum system at the readout frequency. When the quantum system couples to the measurement resonator a property (e.g., impedance) of the measurement resonator changes, such that measurement of the measurement resonator can detect the presence of the readout frequency. In embodiments where measurement resonator is a tank circuit, the presence of the readout frequency can be determined by observing voltage changes or current phase angle changes in the measurement resonator. In some embodiments of the present invention, the readout frequency and the characteristic resonant frequency of the measurement resonator are much less (e.g. 1:100, 1:1000, 1:10,000, or less) than the characteristic frequencies of the quantum system.

Referring to FIG. 1, in an embodiment of the present invention, quantum system 150 is driven by control mechanism 130 to produce a readout frequency that coincides with the characteristic resonance frequency of measurement resonator 110. The readout frequency permits quantum system 150 to interact with measurement resonator 110. This interaction measurably changes a property of measurement resonator 110. For example, the measurable impedance of measurement resonator 110 can depend on the presence of the readout frequency in quantum system 150. In some embodiments of the present invention, a voltage response of measurement resonator 110 is measured to determine if the readout frequency is present.

In the present invention, the readout frequency of quantum system 150 is produced conditionally. In other words, quantum system 150 will only produce the readout frequency when it is induced by control mechanism 130 at a time when the quantum system 150 is in a predetermined state. This conditional behavior can be used to determine what state quantum system 150 is in since measurement resonator 110 will not interact with quantum system 150 unless the requisite readout frequency is produced by quantum system 150. As such, it is possible to gain information about the state of quantum system 150 by detecting the presence of the readout frequency. In addition, measurement resonator 110 operates like a band pass filter, protecting quantum system 150 from adverse noise effects.

Rabi Oscillations

Rabi oscillations are known to occur in quantum systems. Initially discovered in the context of atoms, Rabi oscillations result when a quantum system is irradiated with an alternating signal that has a frequency corresponding to the energy level separation between two energy levels (denoted i and j) of the quantum system. In such systems, the energy level separation is represented as $\Delta E_{ij}$, where the corresponding frequency is $\omega_{ij} = \Delta E_{ij}/\hbar$. When the alternating signal with appropriate frequency $\Omega_R$ is applied, the quantum system oscillates between energy levels i and j at Rabi frequency $\Omega_R$. Rabi frequency $\Omega_2 R$ is determined primarily by the amplitude of the applied alternating signal when a suitable DC bias is applied along with the alternating signal. Thus, by maintaining a fixed frequency of the applied alternating signal and varying the amplitude, Rabi frequency $\Omega_R$ can be controlled. Rabi frequency $\Omega_R$ is typically much less than the characteristic frequencies of quantum system 150. The characteristic frequencies of a quantum system are the frequencies that correspond to the difference between the respective energy levels of the quantum system. For example, the Rabi frequency can be in the range of about 1 to 600 MHz.

In various embodiments of the present invention, a quantum system is used to store and process quantum information. The energy levels of the quantum system are used as the basis states for computation and Rabi oscillations are induced between these basis states to implement quantum computing operations. The quantum systems of the present invention typically comprise qubits or arrays of qubits. In some embodiments, the two lowest energy levels of a qubit, denoted the |0> and |1> states, are used as the basis states of the qubit. These energy levels have a frequency $\omega_{01} = \Delta E_{01}/\hbar$, corresponding to the separation between the |0> and |1> energy levels.

The qubit can be driven at frequency $\omega_{01}$ to induce Rabi oscillations between the basis states. In other words, when the qubit is driven with an alternating signal having a frequency $\omega_{01}$, the state of the qubit will oscillate over time between the basis states |0> and |1>. For example, if the qubit is initially in state |0> and an alternating signal is applied having a frequency $\omega_{01}$, then after some time $t_1$ the state of the qubit will be in state |1>, and further, a time $2t_1$ later the qubit will return to state |0>. Thus, the state of the qubit is a superposition of its basis states:

$$|\psi\rangle = a|0\rangle + b|1\rangle \quad (1)$$

where a and b are referred to as coefficients, corresponding to the probability amplitudes $|a|^2$ and $|b|^2$ respectively, which evolve over time under the influence of the alternating signal. The frequency of the Rabi oscillations are typically much lower than the characteristic frequencies of the qubit. In some embodiments of the present invention, induced Rabi oscillations have Rabi frequencies ranging from 1 MHz to 600 MHz.

Conditional Rabi Oscillations

In some embodiments of the present invention, a quantum system is operated at temperatures low enough to allow the quantum system to relax to its ground state. At such temperatures, the quantum system can be controllably excited to occupy different energy levels simultaneously, creating a superposition of energy levels as in equation (1) above. At higher system temperatures, the quantum system uncontrollably occupies excited states, which is undesirable for the purposes of quantum computing. In order to induce Rabi oscillations, a quantum system must occupy at least one of the selected energy levels, e.g., either the $i^{th}$ or $j^{th}$ energy levels, when an alternating signal having frequency $\omega_{ij}$ is applied. For example, if the temperature of the quantum system is low enough such that the quantum system relaxes to its ground state |0>, then, when the quantum system is driven at frequency $\omega_{12} = \Delta E_{12}/\hbar$, corresponding to the difference in energy between energy levels |1> and |2>, Rabi oscillations in the quantum system will not occur. However, if the quantum system is excited to the first energy level |1>, then Rabi oscillations will occur when the $\omega_{12}$ alternating signal is applied.

In some embodiments of the present invention, quantum system 150 is maintained at temperatures (has an operating temperature of) less than 1 Kelvin (K). Further, in some embodiments of the present invention, quantum system 150 is maintained at temperatures less than 100 milli-Kelvin (mK). In some embodiments of the present invention, control mechanism 130, quantum system 150 and measurement resonator 110 are on a common substrate such as oxidized silicon. In such embodiments, control mechanism 130, quantum system 150 and measurement resonator 110 are maintained at a temperature less than about 1 Kelvin (K), and more preferably, at temperatures less than 100 milli-Kelvin (mK). In some embodiments, all or a portion of measurement resonator 110 is not on the common substrate. For example, in the case where measurement resonator 110 is an LC circuit, the inductor can be on the common substrate and the capacitor can be located off the common substrate (off-chip). In such embodiments, the portion of measurement resonator 110 that is not on the common substrate can be maintained at a temperature that is greater than the operating temperature of quantum system 150. In one such embodiment, the inductor is located on the common substrate and maintained at a temperature of approximately 40 mK while the capacitor is located off the common substrate and is maintained at a temperature between 100 mK and 700 mK.

The present invention provides a way in which the conditional occurrence of Rabi oscillations can be used to determine the state of a quantum system. In one such embodiment of the present invention, the quantum system has at least three energy levels, denoted |0>, |1>, and |2>. The three energy levels are deep enough in a potential energy well to ensure that there is a low probability of escape to the continuum. As described above, when operated at low enough temperatures, the quantum system will relax to its ground state |0>. As described by equation (1), the quantum system can be excited to a superposition of basis states |0> and |1> as $|\psi\rangle = a|0\rangle + b|1\rangle$. Excitation of the state of the quantum system can be realized in a controllable manner, such that the state remains coherent throughout the operation. For example, such excitation can be realized by driving the quantum system with a suitable DC bias signal and an alternating signal having a frequency $\omega_{01}$ for a duration t to induce Rabi oscillations as described above.

In one embodiment of the present invention, quantum system 150 is driven with an alternating signal having a frequency $\omega_{12} = \Delta E_{12}/\hbar$, corresponding to the difference in energy levels |1> and |2> of quantum system 150, such that quantum system 150 undergoes Rabi oscillations between states |1> and |2>, depending on its initial state. That is, if state |1> was populated when the alternating signal was applied, system 150 undergoes Rabi oscillations between states |1> and |2>. If, on the other hand, state |1> was not populated when the alternating signal was applied, system 150 will not undergo Rabi oscillations between states |1> and |2>.

If a quantum system has an initial state $|\psi\rangle = a|0\rangle + b|1\rangle$, then the quantum system occupies state |0> with probability $|a|^2$ and state |1> with probability $|b|^2$. For example, if a quantum system has a state $|\psi\rangle$, then a measurement of the quantum system will yield state |1> with a probability $|b|^2$, destroying the quantum superposition in the process. This is a principle of quantum mechanics and a known aspect of quantum computing. Accordingly, when a quantum system having the initial state $|\psi\rangle = a|0\rangle + b|1\rangle$ is driven with a suitable DC bias signal and an alternating signal having a frequency $\omega_{12}$ for a duration t, then the state of the quantum system will evolve to $|\psi_f\rangle = a|0\rangle + b \cdot RO\,(c|1\rangle + d|2\rangle)$, where RO indicates that the Rabi oscillations occurred only between the corresponding energy states, and the probability amplitudes c and d depend on the duration and amplitude of the driving alternating signal. Thus, after the duration t, the quantum system will be in state |1> with probability $|b \cdot c|^2$ and state |2> with probability $|b \cdot d|^2$.

In accordance with an embodiment of the present invention, measurement resonator 110, having a characteristic resonant frequency $\omega_T$, is used to selectively measure the presence of Rabi oscillations in a quantum system 150. The measurement resonator will couple to the quantum system only when the quantum system is driven to produce a readout frequency that corresponds to a characteristic resonance frequency of the measurement resonator. Since the Rabi frequency depends on the amplitude of the driving alternating signal, the Rabi frequency can be selectively coupled to the measurement resonator. In accordance with the present invention, if the Rabi oscillations have a Rabi frequency $\Omega_R$ that is not approximately the same as the resonance frequency of the measurement resonator, then the quantum system cannot be measured by measurement resonator 110 and will remain coherent. This is an advantage of the present invention that is useful for performing quantum computing operations.

In one embodiment of the present invention, a conditional Rabi oscillation readout comprises driving a quantum system 150 with a suitable DC bias signal and an alternating signal having a frequency $\omega_{12}$ and an amplitude such that the corresponding Rabi oscillations will have a Rabi frequency $\Omega_R$, where $\Omega_R$ is approximately equal to $\omega_T$ the characteristic resonance frequency of the measurement resonator. Then a property of the measurement resonator 110 is measured to determine if the Rabi oscillations did, in fact, occur within quantum system 150. When the quantum system is driven with alternating frequency $\omega$, the state of quantum system 150 will evolve only if it is in at least one of the energy levels that correspond to the applied frequency. As an example, for an initial state $|\psi\rangle = a|0\rangle + b|1\rangle$ and a driving alternating signal with frequency $\omega_{12}$, Rabi oscillations will occur with probability $|b|^2$. If b is zero, then Rabi oscillations will not occur between |1> and |2> when $\omega_{12}$ is applied. If measurement resonator 110 does detect Rabi oscillations (e.g., through a change in a property in measurement resonator 110 when $\omega_{12}$ is applied), then it can be concluded that the quantum system was in the |1> basis state at the time of measurement.

Correspondingly, if no Rabi oscillations are detected, then it can be concluded that the quantum system was in the |0> basis state at the time of measurement.

In some embodiments of the present invention, quantum system 150 comprises a superconducting qubit (e.g., charge, flux, or phase qubit). In general, any superconducting qubit capable of supporting Rabi oscillations between at least two energy levels can be used in the present invention.

Current Biased Josephson Junction

Figure 2:
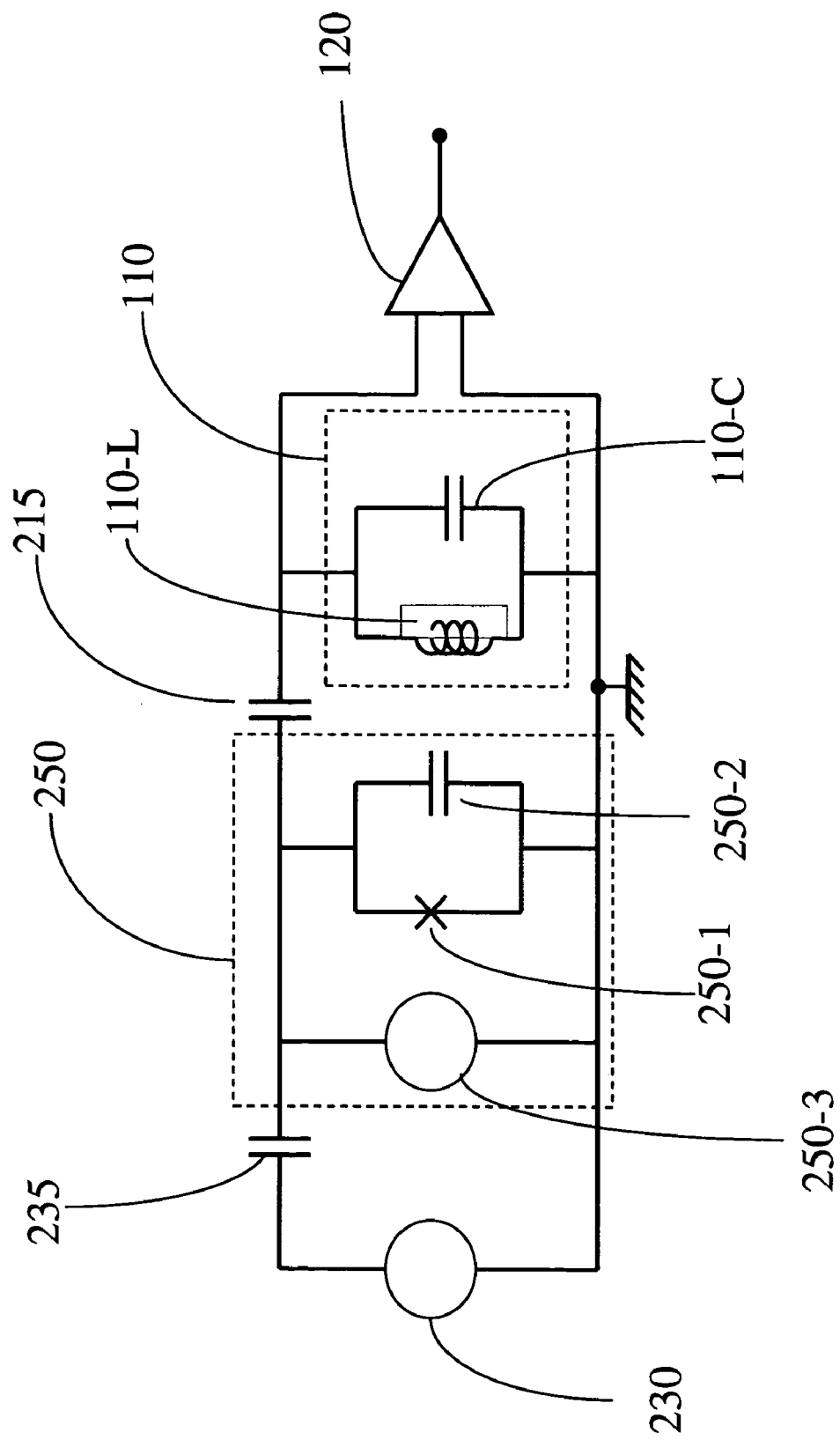
FIG. 2 illustrates a current biased Josephson junction (CBJJ) qubit in accordance with one embodiment of the present invention.

FIG. 2 illustrates a current biased Josephson junction (CBJJ) qubit 250 in accordance with an embodiment of the present invention. CBJJ qubit 250 comprises Josephson junction 250-1, capacitor 250-2, and a bias current source 250-3, each connected in parallel. Components 250-1, 250-2 and 250-3 can each be comprised of one or more subcomponents. For example, Josephson junction 250-1 can comprise one or more Josephson junctions, capacitor 250-2 can, in fact, comprise one or more capacitors and bias current source 250-3 can comprise more than one current source. A single component in the CBJJ qubit can also comprise components 250-1 and 250-2.

Operation of CBJJ qubit 250 is well known in the art. See, for example, Martinis et al., 2002, Phys. Rev. Lett. 89, p. 117901, which is hereby incorporated by reference in its entirety. FIG. 2 further illustrates a control mechanism 230 and measurement resonator 110. In FIG. 2, resonator 110 is a tank circuit having a characteristic resonance frequency $\omega_T$. FIG. 2 further illustrates how capacitors 235 and 215 respectively serve as the coupling mechanisms 135 and 115 discussed above in conjunction with FIG. 1. Control mechanism 230 comprises a mechanism for applying a high frequency alternating signal and an optional DC bias signal to CBJJ qubit 250. In some embodiments of the present invention, measurement resonator 110 comprises a capacitance 110-C and an inductance 110-L. Measurement resonator 110 can be coupled to CBJJ qubit 250 through capacitor 215, such that interaction between measurement resonator 110 and CBJJ qubit 250 occurs when CBJJ qubit 250 is driven by control mechanism 230 to produce a readout frequency corresponding to the characteristic resonance frequency $\omega_T$ of measurement resonator 110. Characteristic resonant tank frequency $\omega_T$ depends on the value of the capacitance and inductance as $\omega_T = 1/\sqrt{L_T C_T}$, where $L_T$ is inductance 110-L, and $C_T$ is capacitance 110-C.

In accordance with the present invention, the characteristic resonance frequency of measurement resonator 110 is significantly different from the characteristic frequencies of CBJJ qubit 250. The characteristic frequencies of CBJJ qubit 250 are the frequencies that correspond to the energy differentials for respective energy state pairs (e.g., states |0> and |1>) in qubit 250. This ensures that there is very little interaction between measurement resonator 110 and CBJJ qubit 250 unless CBJJ qubit 250 is driven to produce a specific readout frequency that corresponds to the characteristic resonance frequency $\omega_T$ of the measurement resonator.

In accordance with the present invention, CBJJ qubit 250 can be driven to produce a Rabi frequency $\Omega_R \approx \omega_T$, such that the CBJJ qubit couples to the measurement resonator. In accordance with embodiments of the present invention, measuring measurement resonator 110 while it is coupled to Rabi oscillations in CBJJ qubit 250 will correspond to different properties than when it is not coupled to Rabi oscillations in CBJJ qubit 250. In some embodiments of the present invention, the impedance of measurement resonator 110 is measured.

Figure 3A:
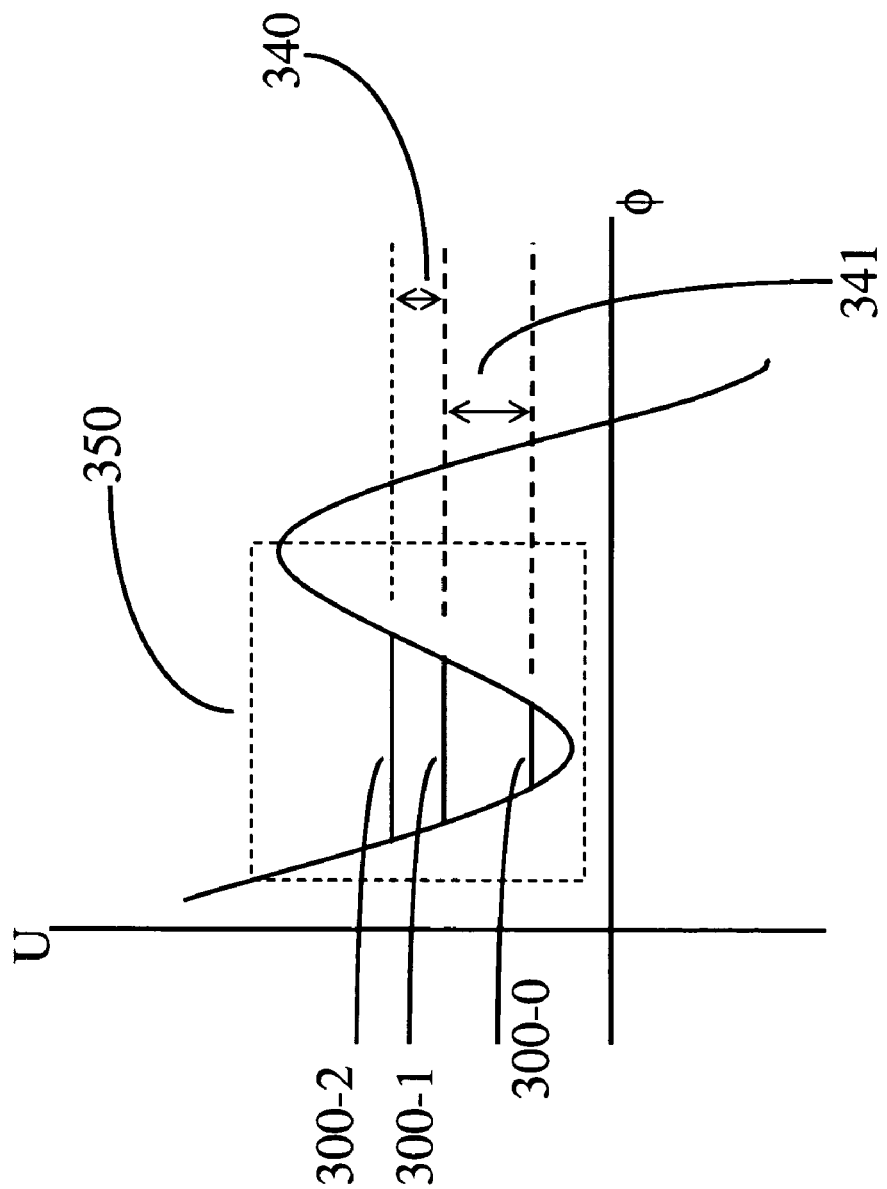
FIGS. 3A-3C illustrate potential energy profiles of quantum systems.

In accordance with an embodiment of the present invention, FIG. 3A illustrates a potential energy profile of a CBJJ qubit 250, along with the energy eigenstates 300-0, 300-1, and 300-2, numbering from lowest energy to highest energy respectively. The magnitude of the energy scale separating energy eigenstates 300-0, 300-1, and 300-2 is controlled by the amount of bias current supplied to the qubit. The 300-0, 300-1, and 300-2 energy eigenstates of the CBJJ qubit are typically respectively referred to as the |0>, |1> and |2> states. The energy difference between state |1> and state |0> is denoted as $\Delta E_{01}$, which corresponds to a frequency $\omega_{01}=\Delta E_{01}/\hbar$. In FIG. 3A, $\Delta E_{01}$ corresponds to energy level separation 341. The energy difference between state |2> and state |1> is denoted as $\Delta E_{12}$, which corresponds to a frequency $\omega_{12}=\Delta E_{12}/\hbar$ (energy level separation 340).

Potential well 350 in FIG. 3A is anharmonic, where neighboring energy levels are not equidistant from each other, so the energy difference is not the same for any pair of neighboring levels. This is in contrast to a harmonic potential, where neighboring energy levels are equidistant from one another, meaning that neighboring energy levels are separated by a certain amount of energy and this amount of energy is the same for every energy level. In an anharmonic potential, as in the case of the current biased Josephson junction qubit, the consequence of the anharmonic potential is that $\Delta E_{01} \neq \Delta E_{12}$.

As described in detail above, Martinis et al. propose a readout method that uses a third energy level |2> selected very close to the top of the potential well. This is chosen because their readout scheme relies on state |2> tunneling out of the potential well which, in turn, causes a voltage drop across the Josephson junction. The probability of any state to tunnel to the voltage state depends on how deep the state is in the potential well. The deeper the state is in the potential well, the less likely it is to tunnel to the voltage state. A detrimental consequence of the readout scheme proposed by Martinis et al. is that the transition to the voltage state causes heating in the qubit, which is undesirable due to the fact that the system must be cooled down again before any new qubit operations can be performed.

In accordance with the present invention, the third energy level |2> is sufficiently deep within the potential well that the probability to tunnel to the voltage state is small. In accordance with the present invention, the readout scheme does not rely on state |2> tunneling to the voltage state in order to effect a readout operation. This lack of tunneling to the voltage state is advantageous compared to the known art since it eliminates the voltage-induced heating and allows more operations to be performed within a given time period.

Although state |2> is deep within the potential well, it is not deep enough in the potential well to be approximated by a harmonic potential. By way of background, the bottom portion of a potential well can be approximated by a harmonic potential regardless of the overall depth characteristics of the well. As the potential well grows deeper, the range of energies over which the potential well can be considered harmonic is greater. In accordance with an embodiment of the present invention, the three energy levels of the CBJJ potential |0>, |1>, and |2>, all have a low probability of escaping from the potential well, while the separations between them are distinguishable, e.g., $\Delta E_{01} \neq \Delta E_{12}$.

Figure 3B:
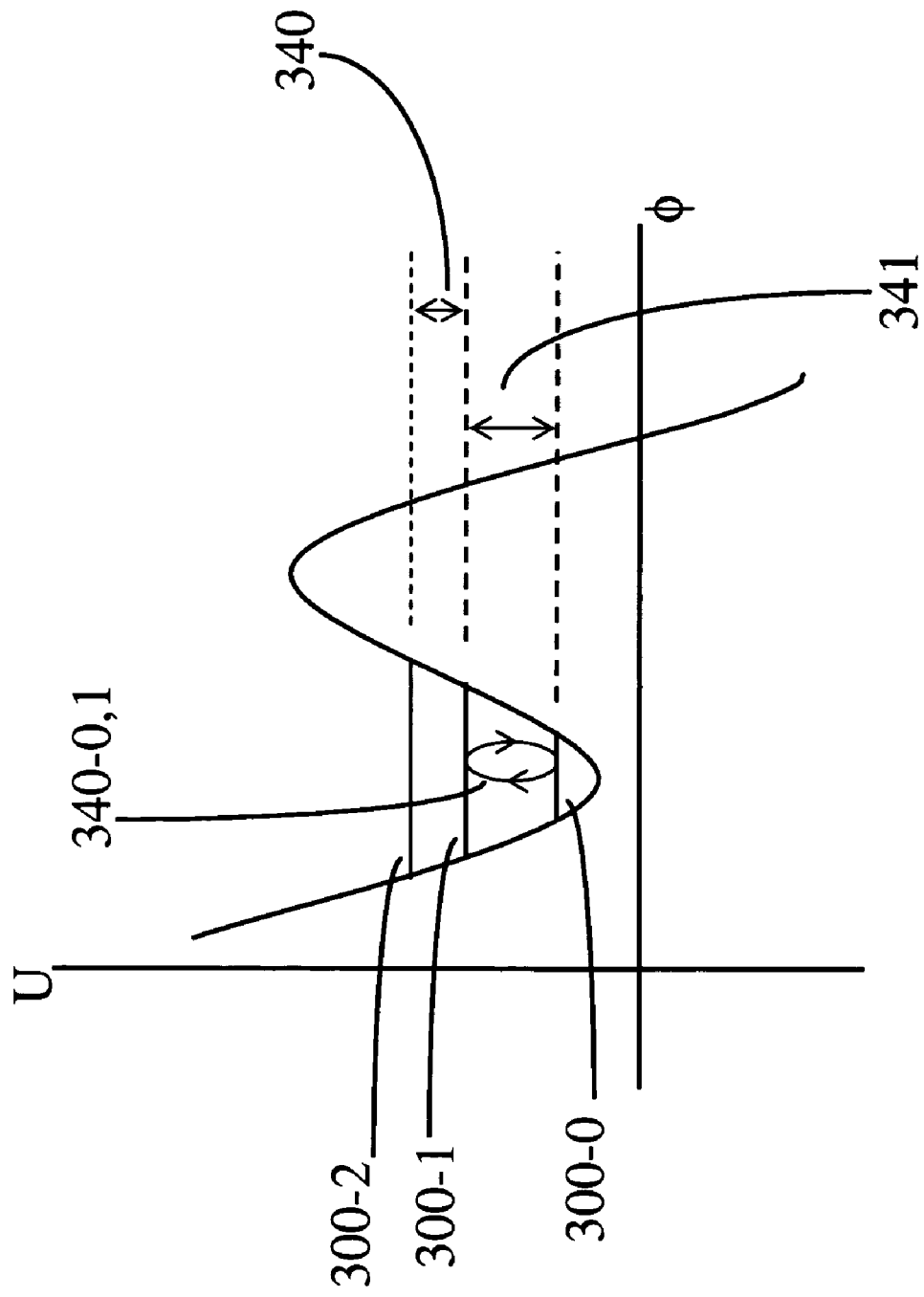

In accordance with embodiments of the present invention, a control mechanism is used to apply alternating signals and DC bias signals to the CBJJ qubit to induce Rabi oscillations between different energy levels. For example, if the qubit is initialized in state $|\psi>=|0>$, and a high frequency current of frequency cool is applied to the qubit (along with a suitable DC bias), Rabi oscillations between state |0> and state |1> will be induced. The final state of the qubit, after the high frequency signal is turned off will be in a mixture of the |0> and |1> states, $|\psi>=a|0>+b|1>$. The frequency at which the qubit oscillates between states |0> and |1>, the Rabi frequency $\Omega R$, is proportional to the amplitude of the applied alternating signal provided that a suitable DC bias signal is applied. In accordance with embodiments of the present invention, the Rabi frequency is tuned by changing the amplitude of the applied high frequency signal. Referring to FIG. 3B, Rabi oscillations between states |0> and |1>, 340-0,1 are induced when an applied alternating signal has a frequency $\omega_a \approx \omega_{01}$ and an appropriate DC bias signal is applied.

Figure 3C:
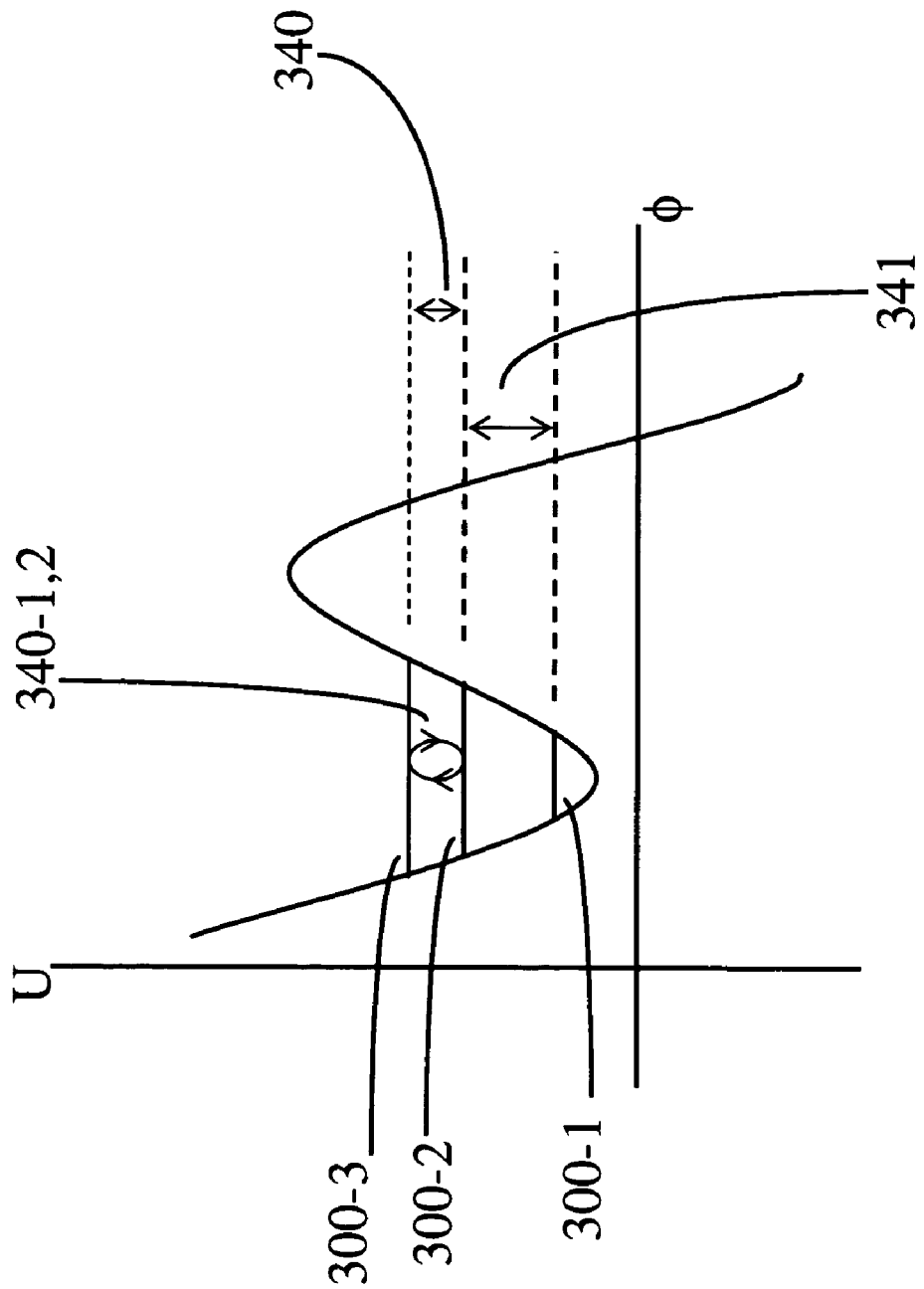

Similarly, Rabi oscillations can also be induced between states |1> and |2>. If the initial state of the qubit is $|\psi>=a|0>+b|1>$, and an alternating signal with frequency $\omega_a \cong \omega_{12}$ and a suitable DC bias signal is applied to the qubit, then the final state of the qubit will be $|\psi>=a|0>+b \cdot RO(c|1>+d|2>)$, where RO indicates the state between which the Rabi oscillations occur, and $|c|^2$ and $|d|^2$ are the probability amplitudes of the states |1> and |2> respectively. Rabi oscillations 340-1,2 between states |1> and |2> are illustrated in FIG. 3C.

Accordingly, the present invention provides a method for determining the state of a CBJJ qubit in an arbitrary initial state, $|\psi>=a|0>+b|1>$ using a measurement resonator, which has a characteristic resonance frequency $\omega_T$, and a control mechanism. In the method, the CBJJ qubit is driven with a DC bias signal and an alternating signal having a frequency $\omega_a$, wherein $\omega_a$ is approximately equal to $\omega_{12}$, the separation between the |1> and |2> energy states of the CBJJ qubit. When the appropriate DC bias signal is applied, the amplitude of the applied alternating signal can drive the CBJJ qubit to produce Rabi oscillations having a Rabi frequency $\Omega_R$ that is about the same as the characteristic resonance frequency of the measurement resonator $\omega_T$. Under these circumstances, the CBJJ qubit will undergo Rabi oscillations depending on the state of the CBJJ qubit at the instant the control signal is applied. To determine if the CBJJ qubit has, in fact, undergone such oscillations, a property (e.g., impedance) of the measurement resonator is measured. For example, if the initial state of the CBJJ qubit is $|\psi>=a|0>+b|1>$, then the Rabi oscillations will occur with a probability of $|b|^2$. Thus, measuring the measurement resonator during this operation will determine the state of the CBJJ qubit at the instant when the control signal was applied.

Three-Junction Flux Qubit

A three-junction flux qubit comprises a loop of superconducting material, interrupted by three Josephson junctions, two of which have the same properties and a third of which has a slightly smaller critical current. See, for example, Il'ichev et al., March 2003, "Continuous Observation of Rabi Oscillations in a Josephson Flux Qubit," arXiv:cond-mat/0303433. When the three-junction flux qubit is biased with a magnetic field to about $\Phi_o/2$, where $\Phi_o$ is a flux quantum, a double-well potential energy structure with respect to phase across the junctions in the loop can be realized. The double-well potential corresponds to a degeneracy between the energy of clockwise and counter-clockwise persistent supercurrents in the loop, hence forming the basis states of the qubit.

Figure 4:
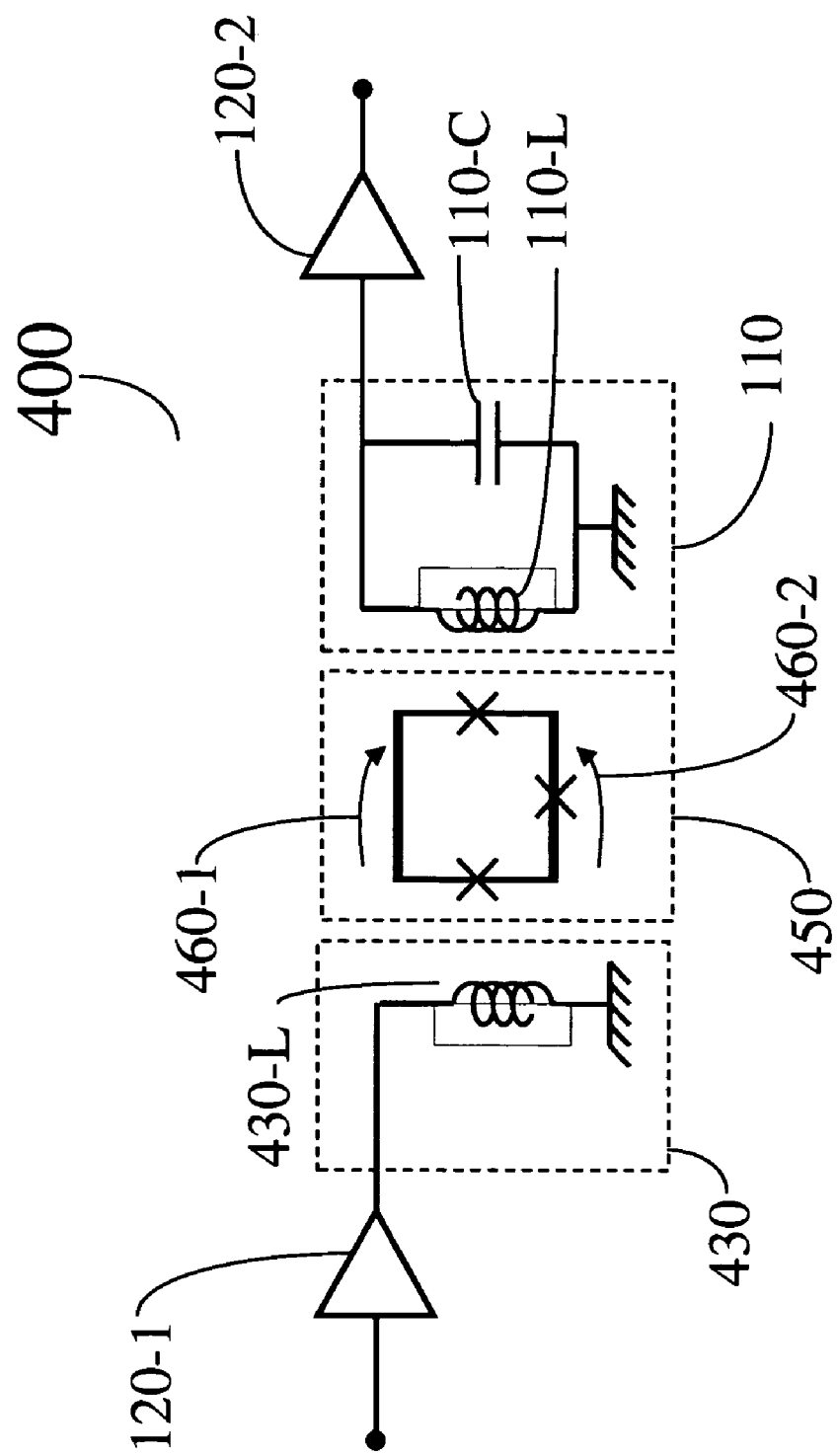
FIG. 4 illustrates an apparatus for determining the quantum state of a quantum system in accordance with one embodiment of the present invention

FIG. 4 illustrates an apparatus 400 of the present invention. The apparatus includes a control mechanism 430, a three-junction qubit 450 having basis states represented by the circulating persistent current in the clockwise direction 460-1 and the counter-clockwise direction 460-2, a measurement resonator 110, an input device 120-1 and an output device 120-2. Advantageously, in an embodiment of the present invention, measurement resonator 110 is inductively connected to three-junction qubit 450. Control mechanism 430 can be inductively connected to three-junction qubit 450 and can include a component for applying a DC bias magnetic field and a component for applying an alternating magnetic field. In some embodiments of the present invention, control system 430 is operated by providing appropriate current through an inductor 430-L that is inductively coupled to three-junction qubit 450.

In an embodiment of the present invention, a measurement resonator and a three-junction qubit are coupled, such that when the three-junction flux qubit is driven to produce a readout frequency that coincides with the resonance frequency of the measurement resonator, measurement of the measurement resonator detects the coupling in a time period less than the relaxation time of the qubit. In some embodiments of the present invention, a readout is performed in a duration ranging from about 10 nano-seconds (ns) to about 10 micro-seconds (μs).

Referring to FIG. 4, measurement resonator 10 has a capacitance 110-C and an inductance 110-L. Measurement resonator 10 has a characteristic resonant frequency, $\omega_T$, that is determined by the values of 110-C and 110-L as $\omega_T = 1/\sqrt{L_T C_T}$, where $L_T$ and $C_T$ correspond to inductance 110-L and capacitance 110-C, respectively. In some embodiments of the present invention, inductance 110-L has values ranging from about 70 pico-Henry (pH) to about 14 micro-Henry (μh), and capacitance 110-C has values ranging from about 70 femto-Farads (fF) to about 140 pico-Farads (pF). In one example of the present invention, measurement resonator 110 has an inductance 110-L of about 1 μH and capacitance 110-C of about 1 nF, corresponding to a resonance frequency $\omega_T/2\pi \cong 5$ MHz. In some embodiments, measurement resonator 10 has a resonance frequency $\omega_T$ ranging from 0.5 MHz to 1,000 MHz. In some embodiments of the present invention, measurement resonator 110 has a quality factor between 1000 and 3000. In a preferred embodiment of the present invention, measurement resonator 110 has a quality factor of about 2000.

Figure 5A:
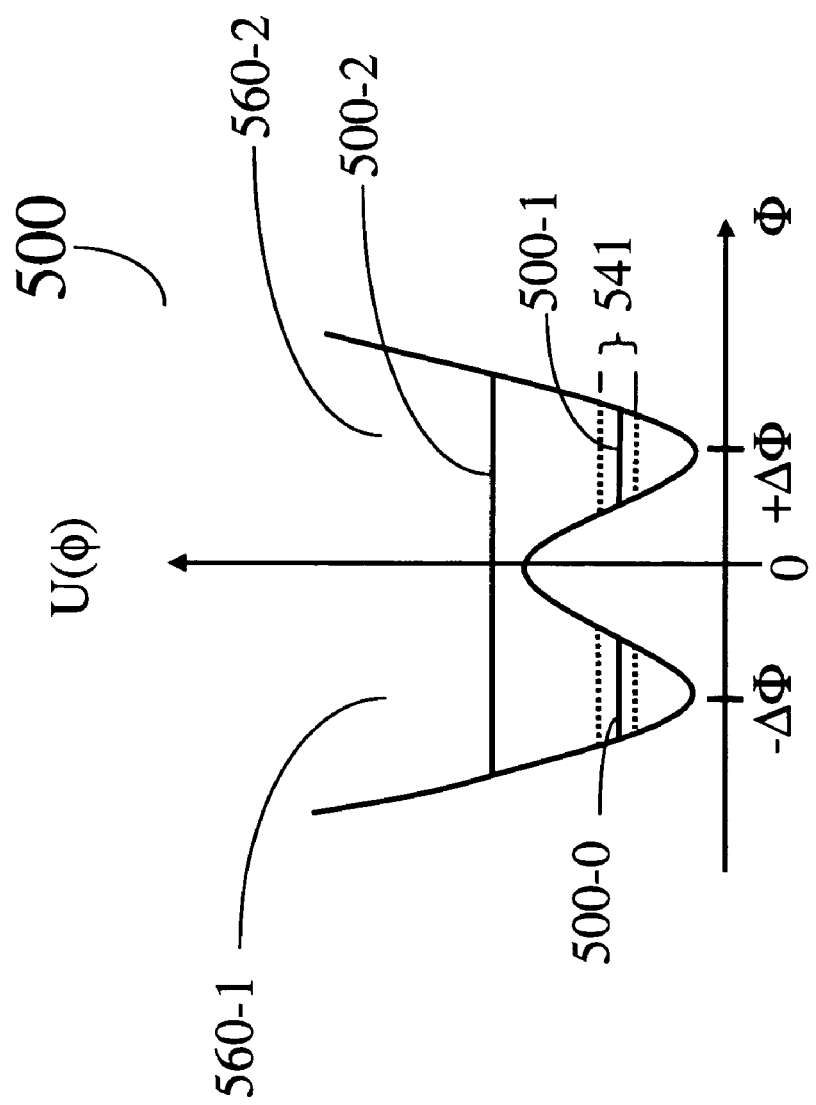
FIG. 5A illustrates a double well energy profile of a quantum system.

FIG. 5A illustrates a double-well potential profile 500 for a three-junction qubit that is useful for quantum computing. Application of a constant-bias magnetic field of about $\Phi_o/2$ over the three-junction flux qubit creates double well potential 500 with respect to phase across the Josephson junctions. Each well of the double well potential has degenerate states that correspond to a direction of circulating persistent supercurrent in the loop. The wells 560-1 and 560-2 of double well potential 500 respectively correspond to the circulating persistent currents 460-1 and 460-2 of FIG. 4. FIG. 5 illustrates the wells 560-1 and 560-2 in the double well potential localized at $\pm\Delta\Phi$, each well having at least one energy level 500-0 and 500-1, respectively. In some embodiments of the present invention, energy levels 500-0 and 500-1 are respectively the |0> and |1> ground states of the qubit. The state of the qubit can be controlled by application of an alternating signal that corresponds to the energy difference 541, referred to as the level splitting of the qubit, such that the qubit undergoes Rabi oscillations between its basis states. This allows the quantum state of the qubit to be controllably evolved from an initial state to an arbitrary superposition of states. For example, a qubit having a double well potential 500 can have an initial state |ψ>=|0>. Then, after driving the qubit with an alternating signal corresponding to the level splitting 541, the state of the qubit has evolved to |ψ>=a|0>+b|1>, where $|a|^2$ and $|b|^2$ are the probability amplitudes of the qubit occupying the states |0> and |1> respectively. A conditional readout operation is then performed to determine the state of the qubit.

In accordance with an embodiment of the present invention, a qubit readout operation comprises providing a qubit having a double well potential energy and an arbitrary initial state and a measurement resonator that is coupled to the qubit, where the measurement resonator has a characteristic resonance frequency $\omega_T$ that is substantially different from the characteristic frequencies of the qubit. The qubit is biased such that the basis states (|0> and |1>) of the qubit are not degenerate and there exists a third energy level |2> that has a low probability of escaping from the double well potential. An alternating signal having a frequency that corresponds to the energy level separation between one of the basis states of the qubit and the third energy level |2> is applied along with a suitable DC bias signal. The resulting Rabi oscillations have a frequency $\Omega_R$ that is about equal to the characteristic resonance frequency of the measurement resonator $\omega_T$. Thus, when the qubit undergoes Rabi oscillations at a frequency $\Omega_R$, the qubit and the measurement resonator become coupled. The properties of the measurement resonator are measured to determine if the Rabi oscillations occurred. Since the qubit is biased and then driven with an alternating signal that corresponds to the separation between only one of the basis states (|0> or |1>) and a third state |2>, the qubit will only exhibit Rabi oscillations with a probability that depends on the state of the qubit at the instant the driving alternating signal is applied.

Figure 5B:
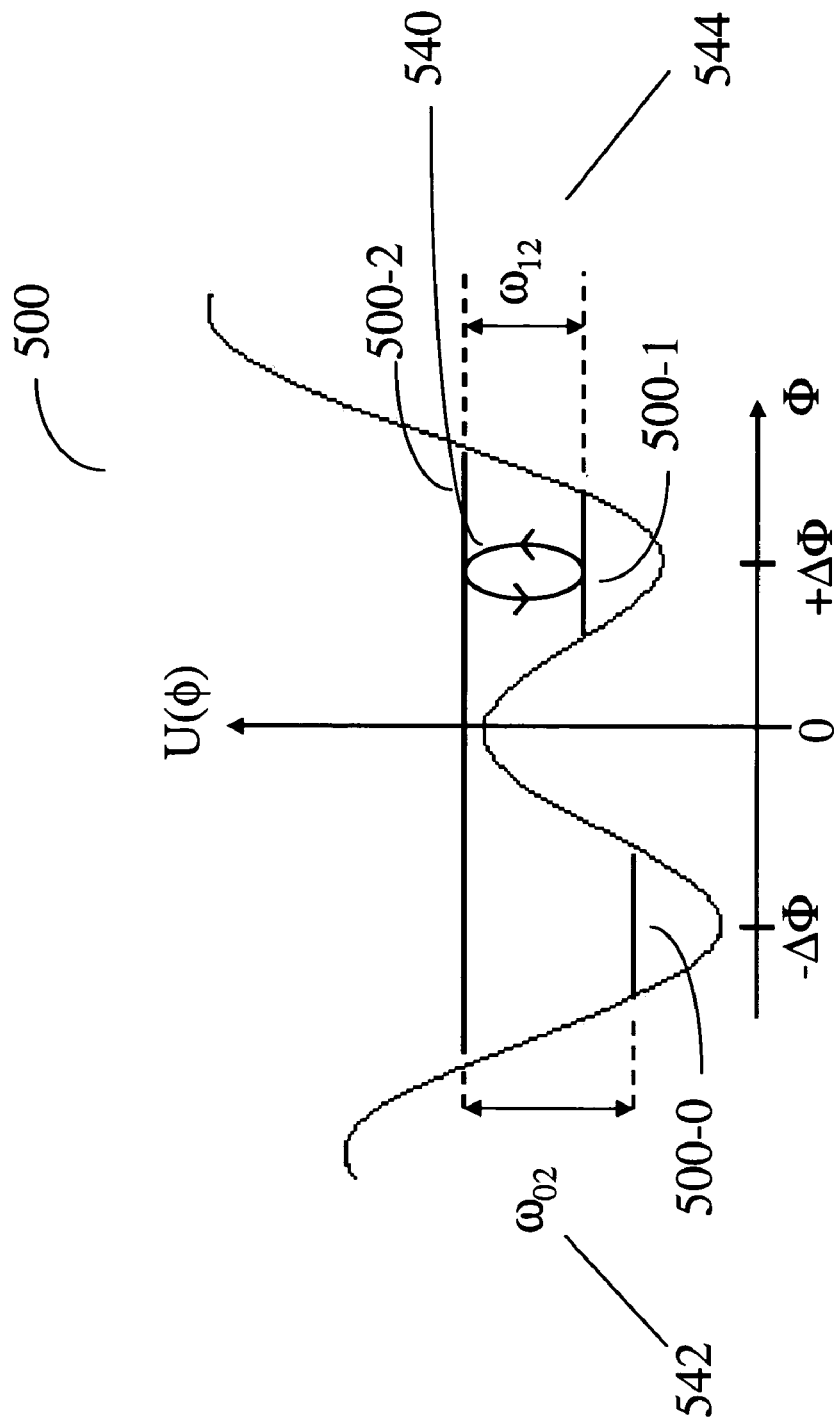
FIG. 5B illustrates a tilted-double well energy profile of a quantum system.

FIG. 5B illustrates double well potential that is biased with respect to phase for a qubit, in accordance with an embodiment of the present invention. The double well potential has basis states 500-0 and 500-1, which are non-degenerate due to the bias as well as a third energy level 500-2. The corresponding separations between the energy levels are $\omega_{02}$ or 542, and $\omega_{12}$, or 544, respectively, and $\omega_{02} \neq \omega_{12}$. If the qubit is driven with a suitable DC bias as well as an alternating signal having a frequency $\omega_a \cong \omega_{12}$, then the qubit will undergo Rabi oscillations 540 between states 500-1 and 500-2 as a function of the state of the qubit at the instant the alternating signal is applied. For example, if the state of the qubit at the time the alternating signal is applied is $|\psi_{init}>=a|0>+b|1>$, then after the alternating signal has been applied for some duration, the final qubit state will be $|\psi_{final}>=a|0>+b\cdot RO(c|1>+d|2>)$, where RO indicates the states corresponding to the Rabi oscillations 540. The Rabi oscillations 540 will occur with a probability $|b|^2$. In accordance with the present invention, if Rabi oscillations 540 have a frequency $\Omega_R$ that is about the same as the characteristic resonance frequency of the measurement resonator $\omega_T$ then the measurement resonator will couple to the qubit only when Rabi oscillations 540 occur. Since the chance that Rabi oscillations 540 will occur directly depends on the state of the qubit at the instant the alternating signal is applied, the present invention advantageously provides a method and structure for reading out the state of the qubit that does not rely on weak measurement techniques. In an embodiment of the present invention, if Rabi oscillations 540 occur, then the state of the qubit at the instant the alternating signal is applied is |1>, and if Rabi oscillations 540 do not occur, then the state of the qubit at the instant the alternating signal is applied is |0>. Conversely, if the alternating signal is applied having a frequency $\omega_{02} \cong \omega_T$ then the interpretation of the occurrence of Rabi oscillations is reversed.

Reading the State of a Qubit Using an Ancillary Quantum State

Another embodiment of the present invention also provides a quantum system for detecting a qubit state. The quantum system comprises a qubit and a measurement resonator. The qubit has at least two basis states and at least one ancillary quantum state. At least one of the ancillary quantum states can be coupled to at least one of the basis states of the qubit in such a manner that the basis state and the ancillary state form a quantum system. The measurement resonator can be coupled to Rabi oscillations in the quantum system.

Selectively Reading the State of One Qubit in a Two Qubit System

As described above, in some situations, a qubit can have three basis states rather than the typical two basis states. One aspect of the present invention provides a two qubit system in which each qubit has three basis states. Such qubits can still be described using ket notation. Instead of only bracketing sets of bits within the ket notation, the ket brackets a set of numbers, where the value of each number is bound to be either 0, 1, or 2. Each number within the ket represents the state of a qubit and the qubits are labeled from left to right starting with qubit 1. In this case, each unique set of numbers within the ket represents a basis state of the quantum system which is comprised of the qubits. Since each qubit can be in one of three possible states, for N qubits where N is a positive integer, the quantum system has $3^N$ basis states. The quantum state of the quantum system can be a superposition of each basis state, $$|\psi\rangle = \sum_{i=0}^{3^N-1} a_i |t_i\rangle,$$

where $t_i$ is the base three representation of i and the sum of the absolute value squared of all of the $a_i$ coefficients is one.

In the case of the two qubit system in which each qubit has three basis states, the qubits are labeled from left to right inside the ket. As an example of this ket notation, if qubit 1 is in state |2> and qubit 2 is in state |0>, then the two qubit state is written as |20>. For the sake of clarity, the two qubit system with three basis states per qubit will be referred to as an extended two qubit system.

In extended two qubit systems, there are nine possible basis states: |00>, |01>, |02>, |10>, |11>, |12>, |20>, |21>, and |22>. Each respective pair of basis states in an extended two qubit system is characterized by a corresponding energy difference and, therefore, a corresponding frequency. For example, the pair of basis states denoted (|00>, |01>) is characterized by an energy difference that represents the difference in the energy levels of the states |00> and |01>. In other words, the pair of basis states denoted (|00>, |01>) is characterized by the difference in the energy state of the extended two qubit system when (i) it is in state |00> and (ii) when it is in state |01>. The notation for these energy differences (and corresponding frequencies) are similar to a two qubit system in which each qubit has only two basis states. For example, the energy difference between state |01> and state |22> is represented as $\Delta E_{01-22}$ and the frequency associated with this energy difference, $\omega E_{01-22}$, is $\Delta E_{01-22}/\hbar$.

The present invention provides a method in which the state of an extended two qubit system is determined. In this method, Rabi oscillations are induced between a pair of states in an extended two qubit system. In order to accomplish this, an alternating signal and, optionally, a bias signal are applied to the extended two qubit system. When the frequency of the alternating signal is equal to the frequency that corresponds to the energy difference between the pair of states in the extended two qubit system, Rabi oscillations are induced between the two states with a frequency that is proportional to the amplitude of the alternating signal. Therefore, the frequency of the Rabi oscillations can be controlled by adjusting the amplitude of the alternating signal. For example, to induce Rabi oscillations between state |00> and state |22>, a control system applies an alternating signal to the extended two qubit system with a frequency approximately equal to $\omega_{00-22} \approx \Delta E_{00-22}$, along with a suitable DC bias signal.

In some embodiments of the present invention, both qubits in an extended two qubit system can be used for quantum computation and readout. In such embodiments, the state of either or both qubit in the two qubit system can be selectively read out. In one such embodiment, the extended two qubit system is initialized to state |00>. Quantum computations are performed on one or both qubits, such that the state of the quantum system evolves to be a coherent superposition of states |00>, |01>, |10>, and |11>, such that the wave function for the system, |ψ>, is a|00>+b|01>+c|10>+d|11>. Then, a measurement on one or both of the qubits in the two qubit system is taken.

In embodiments in which both qubits in an extended two qubit system are used for quantum computation, at any given time, one of the qubits is designated as the measurement qubit while the other qubit is designated the non-measurement qubit. A selective qubit readout of the system is performed by inducing Rabi oscillations between state |2> and a second basis state, denoted |ϕ>, in the measurement qubit. These Rabi oscillations occur only within the measurement qubit and they occur regardless of the state of the non-measurement qubit. In this sense, the Rabi oscillations are similar to the single qubit Rabi oscillations described above. At any given time, only one of the two qubits in the extended two qubit system is the measurement qubit. However, the identity of the measurement qubit can be changed to qubit one from qubit two of the extended two qubit system, or vice versa, by applying an alternating frequency that will specifically induce Rabi oscillations in one of the two qubits.

The condition that Rabi oscillations are limited to state |2> and a second basis state |ϕ> in the measurement qubit and do not arise between any other pair of states in the extended two quantum system imposes some restrictions on the energy levels of the extended two qubit system. For instance, the magnitude of the energy difference between state |2> and basis state |ϕ> of the measurement qubit must not be affected by the state of the non-measurement qubit. For example, consider the case in which qubit 1 is the measurement qubit and qubit 2 is the non-measurement qubit. Consider further that state |1> of qubit 1 is used as the measurement basis state |ϕ>. Therefore, to read out the state of qubit 1, Rabi oscillations are induced between states |1> and |2> of qubit 1. Then, the energy difference between states |1> and |2> of qubit 1 must be the same regardless of the state of qubit 2.

In other words, $\omega_{10\text{-}20} \approx \omega_{11\text{-}21}$, where $\omega_{10\text{-}20}$ is the frequency associated with the energy difference between states $|10\rangle$ and $|20\rangle$ and $\omega_{11\text{-}21}$ is the frequency associated with the energy difference between states $|11\rangle$ and $|21\rangle$. In some embodiments of the present invention, this condition is met when the two qubits of an extended two qubit system are operated in a regime where they are not coupled and do not interact.

A control system is used to apply an alternating signal with frequency, denoted $\omega_A$, that is approximately equal to the frequency corresponding to the energy difference between the pair of states in the measurement qubit that are to be selectively induced to undergo Rabi oscillations. The control system is set such that the frequency of the induced Rabi oscillations, $\Omega_R$, is approximately equal to the resonance frequency of a measurement resonator $\omega_T$. Typically, the control system is set by adjusting the amplitude of the alternating signal generated by the control system. The control system is also set such that the Rabi oscillations that are induced in the extended two qubit system have a measurable affect on a property of the measurement resonator. If the measurement resonator property does, in fact, change when the control system is applied in this manner, then the state of the measured qubit is $|\phi\rangle$. If the measurement resonator property does not change, then the state of the measured qubit is not $|\phi\rangle$ or $|2\rangle$. After the state of the measurement qubit has been read, a readout can be performed on the non-measurement qubit, using the techniques described above.

A selective qubit readout in the extended two qubit system, which uses qubit one as the measurement qubit and state $|1\rangle$ as the measurement basis state (i.e. $|\phi\rangle=|1\rangle$), will now be described. After quantum computations are performed on the extended two qubit system, the state of the system is $|\psi\rangle = a|00\rangle + b|01\rangle + c|10\rangle + d|11\rangle$, where $|a|^2 + |b|^2 + |c|^2 + |d|^2$ is equal to 1. A control system applies an alternating signal with frequency $\omega_A$, where $\omega_A$ is approximately equal to the frequency associated with the energy difference between state $|1\rangle$ and state $|2\rangle$ of the measurement qubit. Further, the control system applies a suitable (optional) bias signal. Because the frequency associated with this transition is independent of the state of the second qubit, $\omega_A \approx \omega_{10\text{-}20} \approx \omega_{11\text{-}21}$. The amplitude of the alternating signal is adjusted so that the frequency of the induced Rabi oscillations, $\Omega_R$, is approximately equal to the resonance frequency of the measurement resonator, $\omega_T$. In embodiments of the present invention, care is taken to make sure that the control system is used to induce Rabi oscillations that have a measurable affect on a property (e.g., impedance) of the measurement resonator. For example, if the measurement resonator is sensitive to charge oscillations, but not phase oscillations, then the control system is adjusted to induce Rabi oscillations in the charge basis rather than the phase basis. If the measurement resonator property changes when the control system applies the alternating signal, then qubit one is in state $|1\rangle$. If the measurement resonator property does not change when the control system applies the alternating signal, then qubit one is in state $|0\rangle$. The state of qubit two can be measured in a similar manner.

Structure of Two Coupled CBJJ Qubits

Figure 6:
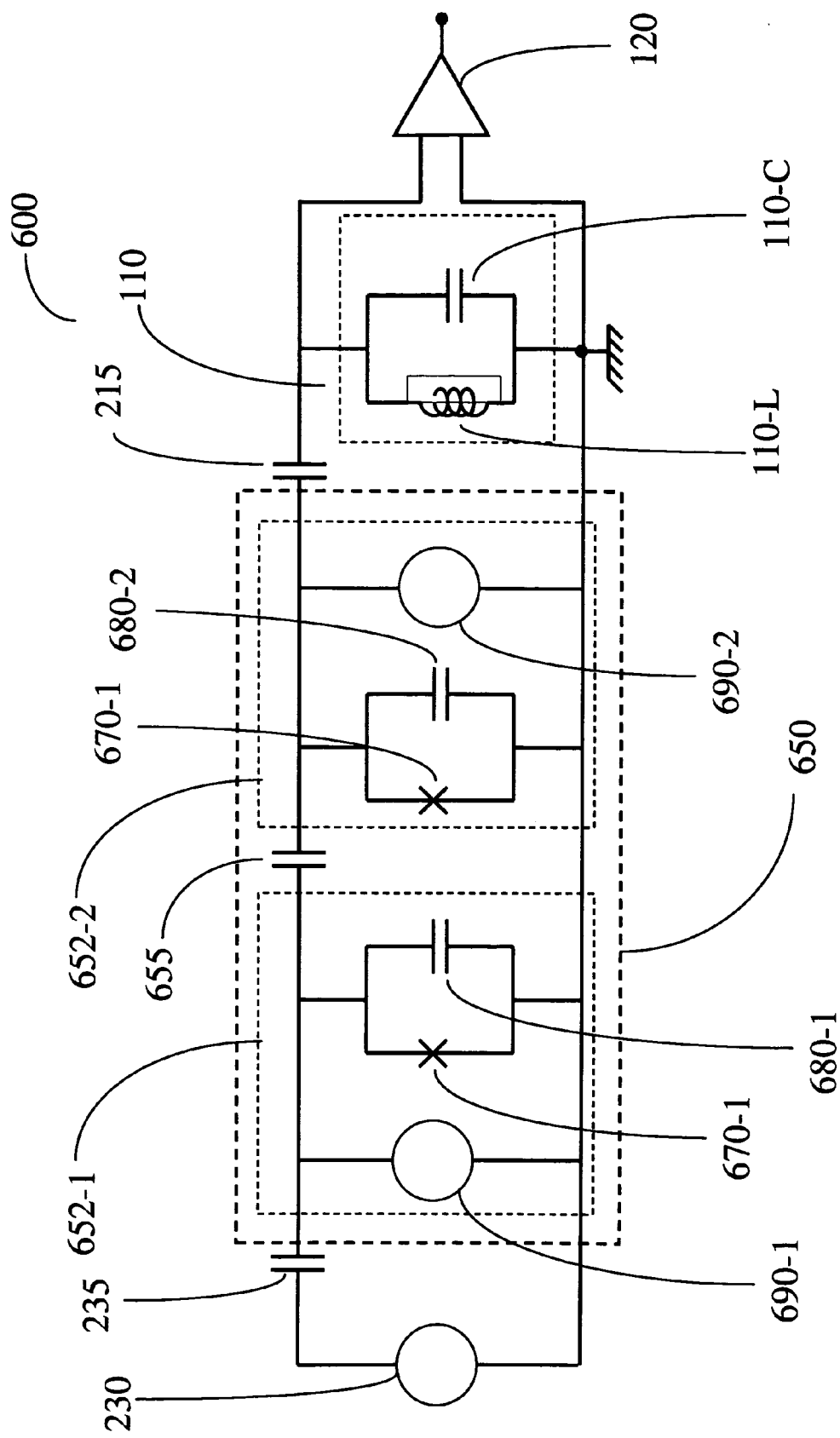
FIG. 6 illustrates an embodiment of the present invention comprising two current biased Josephson junction (CBJJ) qubits.

FIG. 6 illustrates an apparatus 600 in accordance with the present invention. Apparatus 600 comprises a first current biased Josephson junction (CBJJ) qubit 652-1 and a second CBJJ qubit 652-2. Qubits 652 each have an effective Josephson junction 670, capacitor 680, and bias current source 690, each connected in parallel. As used herein, the term "effective" means that a given component can in fact comprise any combination of components. For example, an effective Josephson junction 670 can comprise any number of Josephson junctions arranged in parallel and/or series. Qubits 652 are connected by capacitor 655 which couples the two qubits under certain conditions, such as degeneracy between the respective basis states of each qubit, $\omega_{01}^1 \cong \omega_{01}^2$. Bias current source 690 adjusts the energy level characteristics of qubits 652. In some embodiments, qubits 652 are treated as a single quantum system 650. The operation and capacitive coupling of two CBJJ qubits is well known in the art. See, for example, Blais et al., U.S. patent application Ser. No. 10/419,024, filed Apr. 17, 2003, which is hereby incorporated by reference in its entirety.

Apparatus 600 further comprises a control mechanism 230 that is used to conditionally induce Rabi oscillations in quantum system 650. Capacitor 235 connects control mechanism 230 to quantum system 650. Control mechanism 230 can be used to apply a signal at frequencies corresponding to transitions within quantum system 650 such that capacitor 235 couples control mechanism 230 to qubit 652-1 and/or qubit 652-2 of quantum system 650. When the control mechanism 230 is applying signals with frequencies that do not correspond to frequencies of the quantum system, then the control mechanism 230 will not couple to quantum system 650. In some embodiments of the present invention, control mechanism 230 comprises a mechanism for applying a high frequency alternating signal and a bias signal to qubits 652.

Apparatus 600 further comprises measurement resonator 110. Capacitor 215 connects measurement resonator 110 to qubits 652 in the frequency dependent manner described above. Thus, when quantum system 650 creates a certain signal, capacitor 215 couples measurement resonator 110 to qubit 652-1 and/or qubit 652-2. In the embodiment illustrated in FIG. 6, measurement resonator 110 is a tank circuit having a characteristic resonance frequency $\omega_T$. In some embodiments of the present invention, measurement resonator 110 comprises capacitance 110-C and inductance 110-L and $\omega_T$ depends on the value of the capacitance and inductance according to the relationship $\omega_T = 1/\sqrt{L_T C_T}$, where $L_T$ is inductance 110-L and $C_T$ is capacitance 110-C.

In some embodiments of the present invention, measurement resonator 110 is coupled to quantum system 650 through capacitor 215 so that measurement resonator 110 couples to frequencies in quantum system 650 that correspond to its resonant frequency. In fact, measurement resonator 110 can be coupled to one of qubit 652-1 or qubit 652-2 through capacitor 215, such that interaction between measurement resonator 110 and the coupled qubit occurs when the coupled qubit is driven by control mechanism 230 to produce a readout frequency corresponding to the characteristic resonance frequency $\omega_T$ of measurement resonator 110.

In the present invention, the characteristic resonance frequency of measurement resonator 110 is significantly different from the characteristic frequencies of quantum system 650 (e.g., the characteristic frequencies of qubit 652-1 and 652-2). The characteristic frequencies of quantum system 650 are the frequencies that correspond to the magnitude of the energy differences between energy state pairs in quantum system 650. This ensures that there is very little interaction between measurement resonator 110 and quantum system 650 unless quantum system 650 (e.g., an energy difference therein) is driven to produce a specific readout frequency that corresponds to the characteristic resonance frequency $\omega_T$ of measurement resonator 110.

Quantum system 650 (e.g. one of qubits 652) can be driven to produce a Rabi frequency $\Omega_R \cong 107 _T$, such that quantum system 650 (e.g., the qubit 652 that was driven to produce Rabi frequency $\Omega_R \cong \omega_T$) couples to measurement resonator 110. In accordance with embodiments of the present invention, the measurement of a property of measurement resonator 110, while it is coupled to Rabi oscillations in quantum system 650, will correspond to different properties then when it is not coupled to Rabi oscillations in quantum system 650. In some embodiments of the present invention, this property is impedance and, in such embodiments, the impedance of measurement resonator 110 is measured.

The characteristic frequencies associated with qubit 652-1 and qubit 652-2 can be tuned such that, in addition to being significantly different from the characteristic frequencies of measurement resonator 110, the characteristic frequencies of qubit 652-1 are significantly different than the characteristic frequencies of qubit 652-2. This requirement ensures that each qubit can be addressed individually by control mechanism 230. This also ensures that each qubit 652 can be individually coupled to measurement resonator 110 without coupling the other qubit 652 to measurement resonator 110.

Selectively Reading One CBJJ Qubit in a Two CBJJ Qubit System

In an embodiment of the present invention, apparatus 600 is used as an extended two qubit system such that the state of one CBJJ qubit 652 is read out at a time. The extended two qubit system requires that qubits 652 have three basis states. Three basis states in a CBJJ qubit is realizable as discussed above and in Clarke et al., "Quantum Mechanics of a Macroscopic Variable: The Phase Difference of a Josephson Junction," Science, 239, pp. 992-997 (1988) which is hereby incorporated by reference in its entirety.

Before a readout is performed, quantum computations on qubit 652-1 and/or qubit 652-2 are performed. First, quantum system 650 is initialized into state |00>. Then quantum computations are performed on qubits 652 that bring quantum system 650 to a coherent superposition of states |00>, |01>, |10>, and |11>, such that $|\psi\rangle = a|00\rangle + b|01\rangle + c|10\rangle + d|11\rangle$ and $|a|^2 + |b|^2 + |c|^2 + |d|^2 = 1$. Methods for performing quantum computations on two coupled CBJJ qubits are known. See for example Blais et al., U.S. patent application Ser. No. 10/419,024, filed Apr. 17, 2003, which is hereby incorporated by reference in its entirety. Then, a readout is performed on quantum system 650 to measure the state of a first qubit 652. The state of a second qubit 652 can be read out in the same manner as the state of the first qubit 652 is read out.

To illustrate this method, consider the case in which the state of qubit 652-1 is measured prior to measuring the state of qubit 652-2. It will be appreciated that, alternatively, the state of qubit 652-2 can be measured prior to measuring the state of qubit 652-1. First, control mechanism 230 is used to couple qubit 652-1 to measurement resonator 110 without coupling qubit 652-2 to measurement resonator 110. Qubit 652-1 is coupled to measurement resonator 110 by inducing Rabi oscillations between state |2> of qubit 652-1 and another basis state, |φ>, of qubit 652-1. Rabi oscillations in qubit 652-2 are not induced while the state of qubit 652-1 is being measured.

For the sake of this example, an attempt to induce Rabi oscillations between states |2> and |1> of qubit 652-1 is discussed. Alternatively, an attempt to induce Rabi oscillations between states |2> and |0> of qubit 652-1 could have been made. An attempt to induce Rabi oscillations between states |2> and |1> of qubit 652-1 is made by applying an alternating signal with frequency $\omega_{11\text{-}21} \approx \omega_{10\text{-}20}$ and a suitable bias signal using control mechanism 230. Control mechanism 230 is set such that the frequency of the induced Rabi oscillations, $\omega_R$, is approximately equal to the resonant frequency of measurement resonator 110, $\omega_T$. In an embodiment of the present invention, the property of the measurement resonator that is affected is the impedance. If a change in the property of measurement resonator 110 is measured, then Rabi oscillations were in fact induced in qubit 652-1 and, therefore, qubit 652-1 was in state |1> at the time of measurement. If no change in the property of measurement resonator 110 is measured, then no Rabi oscillations were induced in qubit 652-1 and, therefore, qubit 652-1 was in state |0> at the time of measurement. After the state of qubit 652-1 has been measured, the state of qubit 652-2 can be measured in a similar manner as was described above.

Structure of Two Coupled Three-Junction Flux Qubits

Figure 7:
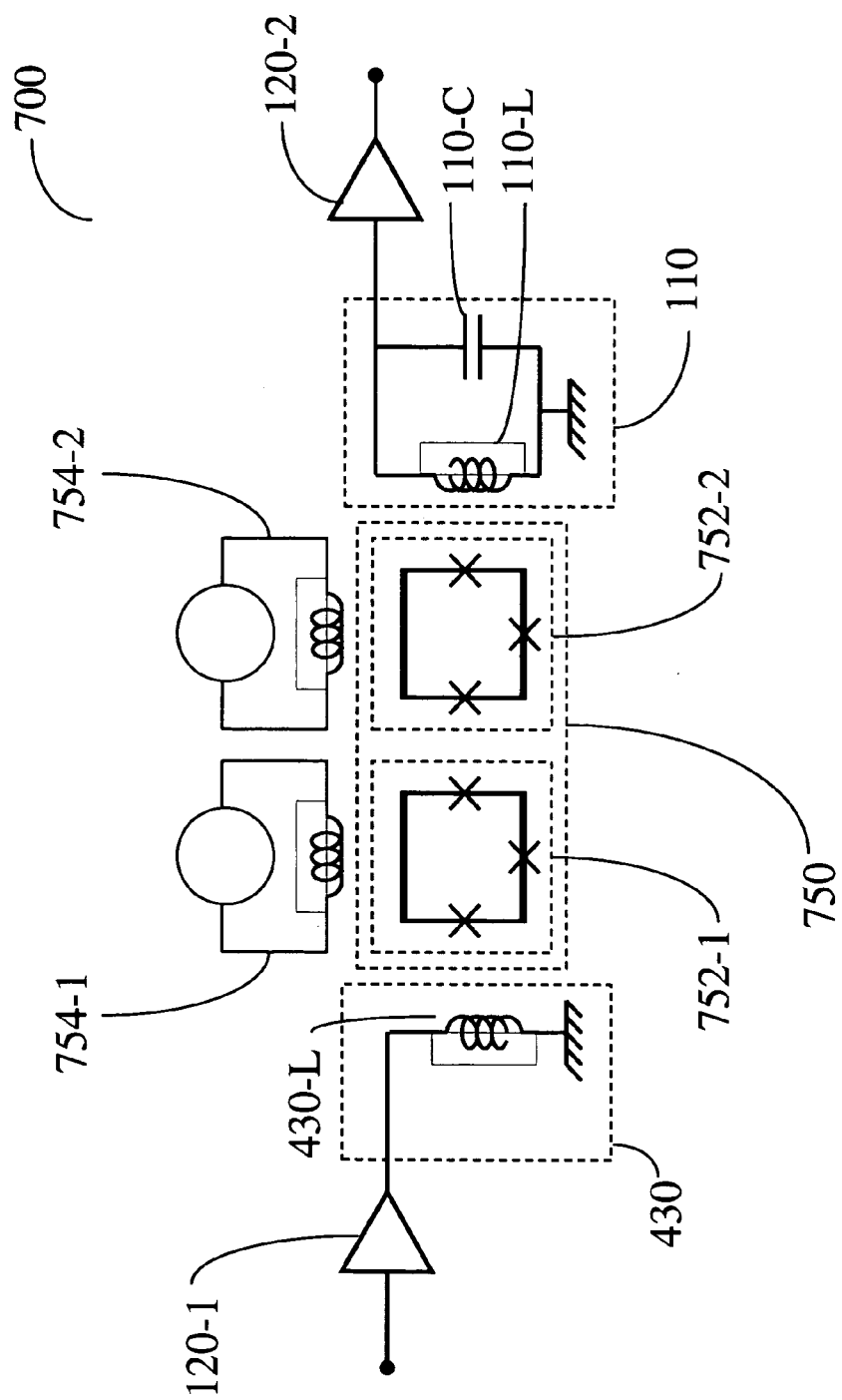
FIG. 7 illustrates two three-junction flux qubits in accordance with the present invention.

FIG. 7 illustrates an apparatus 700 that comprises a first three-junction flux qubit 752-1 and a second three-junction flux qubit 752-2 in accordance with the present invention. Each three-junction flux qubit 752 comprises a loop of superconducting material, interrupted by three Josephson junctions, two of which have the same properties and the third of which has a slightly smaller critical current. Qubits 752 are inductively coupled and the inductive coupling can be turned on and off. See Mooij et al., which is hereby incorporated by reference in its entirety, for details of the operation of two coupled three-junction flux qubits. In an embodiment of the present invention, the two three-junction flux qubits can be inductively coupled via an additional superconducting loop. In another embodiment of the present invention, the two three-junction flux qubits can be inductively coupled via mutual inductance and this coupling can be tuned by biasing the qubits in and out of degeneracy. Local magnetic field sources 754-1 and 754-2 serve to respectively adjust the energy level characteristics of qubits 752-1 and qubit 752-2. In some embodiments, local magnetic fields are provided by applying a signal to an inductor that is placed next to the qubits. Control systems 754 are used to apply local magnetic fields to qubits 752. In some embodiments of the present invention, the combination of qubits 752-1 and qubit 752-2 is treated as a single quantum system 750 (FIG. 7). The operation and inductive coupling of two three-junction flux qubits is well known in the art. See, for example, Mooij et al., which is hereby incorporated by reference in its entirety.

Apparatus 700 further comprises input device 120-1 and control mechanism 430 that are used to control the dynamics of qubits 752. Input device 120-1 can be used to apply a signal at frequencies corresponding to transitions within quantum system 750 such that control mechanism 430 couples control mechanism 230 to qubit 752-1 and/or qubit 752-2 of quantum system 750. When the input device 120-1 is applying signals with frequencies that do not correspond to frequencies of the quantum system, then the control mechanism 430 will not couple to quantum system 750. In some embodiments of the present invention, input device 120-1 and control mechanism 430 comprise a mechanism for applying a high frequency alternating signal and a bias signal to qubits 752. In some embodiments of the present invention, control mechanisms 430 and 754 are used to control parameters of quantum system 750. Parts of control mechanisms 430 and 754 can be off-chip. In other words, the source of control for control mechanisms 430 and 754 can originate from a source that is not on the substrate that supports quantum system 750. In some embodiments, control of at least one of control mechanisms 430,754-1, or 754-2 comes from this off-chip origin. In some embodiments, control of at least one of control mechanisms 430, 754-1, or 754-2 comes from a control chip located at a higher temperature than the quantum chip. Furthermore, control of at least one of control mechanisms 430, 754-1, or 754-2 can come from a room temperature control device. Examples of room temperature control devices include commercially available pulse generators such as the Anritsu MP1758A or the Agilent E8257C.

FIG. 7 further illustrates a measurement resonator 110. Under certain circumstances, measurement resonator 110 is inductively coupled to qubit 752-1 and/or qubit 752-2. In FIG. 7, measurement resonator 110 is a tank circuit having a characteristic resonance frequency $\omega_T$, an inductance $L_T$, and a capacitance $C_T$ as described in conjunction with FIG. 6, above.

Measurement resonator 10 can be inductively coupled to quantum system 750 so that interaction between measurement resonator 10 and quantum system 750 occurs when quantum system 750 (e.g., qubit 752-1 or qubit 752-2) is driven by control mechanism 430 to produce a readout frequency corresponding to the characteristic resonance frequency $\omega_T$ of measurement resonator 110. In apparatus 700, the characteristic frequency of measurement resonator 10 is significantly different from the characteristic frequencies of quantum system 750 (e.g., the characteristic frequencies of qubit 752-1 or qubit 752-2). This ensures that there is very little interaction between measurement resonator 10 and quantum system 750 unless quantum system 750 (e.g., qubit 752-1 or qubit 752-2) is driven to produce a specific readout frequency that corresponds to the characteristic resonance frequency $\omega_T$ of measurement resonator 110.

Quantum system 750 (e.g., qubit 752-1 or 752-2) can be driven to produce a Rabi frequency $\omega_R \approx \omega_T$, such that quantum system 750 (e.g., qubit 752-1 or 752-2) couples to measurement resonator 110. The measurement of a property of measurement resonator 110 while it is coupled to Rabi oscillations in quantum system 750 will correspond to different values (e.g., different impedance) than when it is not coupled to Rabi oscillations in quantum system 750.

In system 700, the characteristic frequencies associated with qubits 752-1 and 752-2 can be tuned so that, in addition to being significantly different from the characteristic frequencies of measurement resonator 110, the characteristic frequencies of qubits 752-1 are significantly different than the characteristic frequencies of qubit 752-2. This requirement ensures that each qubit can be addressed individually by control mechanism 430. This also ensures that each qubit can be individually coupled to measurement resonator 10 without coupling the other qubit to measurement resonator 110.

Selectively Reading the State of One Three-Junction Qubit in a Two Three-Junction Qubit System In an embodiment of the present invention, apparatus 700 (FIG. 7) is used to selectively read out the state of a three-junction qubit in an extended two qubit system. The qubits in an extended two qubit system have three basis states. Three basis states are realized, for example, in a three-junction qubit. A qubit similar to the three-junction qubit described in this embodiment of the present invention is disclosed in Zhou et al., which is hereby incorporated by reference in its entirety.

Before a readout of a qubit in apparatus 700 is performed, quantum computations are performed by first initializing quantum system 750 to state |00> and then performing quantum computations on qubits 652 thereby bringing quantum system 650 to a coherent superposition of states |00>, |01>, |10>, and |11>, where $|\psi\rangle = a|00\rangle + b|01\rangle + c|10\rangle + d|11\rangle$ and $|a|^2 + |b|^2 + |c|^2 + |d|^2 = 1$.

After quantum computation, a readout is performed on quantum system 750 to measure the state of a first qubit 752. The state of the second qubit 752 is read out after the state of the first qubit 752 is read out. To illustrate, the case in which the state of qubit 752-1 is measured prior to the state of qubit 752-2 is discussed. A readout operation is effected by using control system 430 to couple qubit 752-1 to measurement resonator 110 without coupling qubit 752-2 to the resonator. Qubit 752-1 is coupled to measurement resonator 110 by inducing Rabi oscillations between state |2> of qubit 752-1 and another basis state, $|\phi\rangle$, of qubit 752-1. Rabi oscillations in qubit 752-2 are not induced by this operation. In this example, $|\phi\rangle$ is |1>, thus, Rabi oscillations between states |2> and |1> of qubit 752-1 are induced. Alternatively, $|\phi\rangle$ could have been |0>, and Rabi oscillations could have been induced between states |2> and |0> of qubit 752-1 in order to measure the state of qubit 752-1. Rabi oscillations are induced between states |2> and |1> of qubit 752-1 by using control system 430 to apply an alternating signal with frequency $\omega_{11-21} \approx \omega_{10-20}$ as well as a suitable bias signal. Control system 430 is set such that the frequency of the Rabi oscillations, $\Omega_R$, are approximately equal to the resonant frequency of measurement resonator 110, $\omega_T$. If a change in the property (e.g. impedance) of measurement resonator 110 is measured, qubit 752-1 was in state |1>. If no change in the property of measurement resonator 110 is measured, qubit 752-1 was in state |0>. After the state of qubit 752-1 has been measured, the state of qubit 752-2 can be measured in a similar manner.

Measuring the State of One Qubit Using a Coupled Ancillary Qubit

Some embodiments of the present invention do not require qubits that have three states. Rather, in such embodiments, each test qubit is coupled with an ancillary qubit and an energy state of the ancillary qubit is used to determine which state the test qubit is in after a quantum computation.

Notation for such two-qubit quantum systems will now be described. Energy Eigenstate |00> of such two-qubit systems correspond to both qubit one (the test qubit) and qubit two (the ancillary qubit) being in state |0>. Eigenstate |01> of such two-qubit systems correspond to qubit one being in state |0> and qubit two being in state |i). Eigenstate |10> of such two-qubit systems corresponds to qubit one being in state |1> and qubit two being in state |0>. Eigenstate |11> of the two-qubit system corresponds to both qubit one and qubit two being in state |1>.

Each pair of energy eigenstates in a two-qubit quantum system have an associated energy difference that can typically be tuned by adjusting parameters of each qubit. The energy difference between state |00> and state |01> is referred to as $\Delta E_{00-01}$, which corresponds to a frequency $\omega_{00-11} = \Delta E_{00-01}/\hbar$. The energy difference between state |00> and state |10> is $\Delta E_{00-11}$, which corresponds to frequency $\omega_{00\text{-}10}=\Delta E_{00\text{-}10}/\hbar$. The energy difference between state |01> and state |11> is referred to as $\Delta E_{01\text{-}11}$, which corresponds to frequency $\omega_{00\text{-}11}=\Delta E_{00\text{-}11}/\hbar$. The energy difference between state |01> and state |10> is referred to as $\Delta E_{10\text{-}11}$, which corresponds to frequency $\omega_{10\text{-}11}=\Delta E_{10\text{-}11}/\hbar$. The energy difference between state |01> and state |11> is referred to as $\Delta E_{01\text{-}11}$, which corresponds to frequency $\omega_{01\text{-}11}=\Delta E_{01\text{-}11}/\hbar$. The energy difference between state |10> and state |11> is referred to as $\Delta E_{10\text{-}11}$, which corresponds to a frequency $\omega_{10\text{-}11}=\Delta E_{10\text{-}11}/\hbar$.

In the present invention, Rabi oscillations are induced between any pair of states in the two-qubit system. In order to induce Rabi oscillations between two different states of the two-qubit system, a suitable bias signal and an alternating signal is applied to the two-qubit system so that the frequency of the alternating signal is equal to the frequency that corresponds to the energy difference between the two different states. When a suitable bias signal is applied, the frequency of the Rabi oscillations is proportional to the amplitude of the alternating signal. In this way, the frequency of the Rabi oscillations are controlled by adjusting the amplitude of the alternating signal. For example, to induce Rabi oscillations between state |00> and state |11>, a control system is used to apply an alternating signal to the two qubit system with a frequency approximately equal to $\omega_{00\text{-}11}$.

In preferred embodiments, the frequency applied in order to induce the desired Rabi oscillations is distinct from the frequencies that will induce transitions between other possible basis state pairs in the two-qubit system in order to prevent unwanted Rabi oscillations. If the frequency applied to induce Rabi oscillations between a first basis state pair in the two qubit system is approximately the same as a frequency that will induce Rabi oscillations between a second basis state pair in the two qubit system, then Rabi oscillations will be induced between the second basis state pair if at least one state in the second basis state pair is at least partially populated when the alternating signal is applied. If neither state in the second basis state pair is populated when the alternating signal is applied, then no Rabi oscillations will occur between states of the second basis state pair. In such instances, it is acceptable for the frequency applied to induce Rabi oscillations in the first basis state pair to be approximately the same as the frequency capable of inducing Rabi oscillations in the second basis state pair.

In one embodiment of the present invention, the second qubit in the two-qubit quantum system is used as an ancillary qubit to measure the state of the first qubit in the two qubit system. The assignment of a qubit in the two-qubit quantum system as the first qubit or the second qubit (the ancillary qubit) is arbitrary. Quantum computations are performed on the first qubit. The state of the second qubit (the ancillary qubit) remains unchanged throughout such quantum computations. To perform the quantum computations on the first qubit, the two-qubit quantum system is initialized to state |00>. Operations are performed on the quantum system that only affect transitions in the first qubit, such that the state of the quantum system evolves to be a coherent superposition of state |00> and state |10>, where $|\psi>=a|00>+b|10>$ and $|a|^2+|b|^2=1$. A control mechanism is used to apply a oscillations are induced between state |10> and a state other than state |00>. The amplitude of the alternating signal is set by the control system such that the frequency of the Rabi oscillations, $\Omega_R$, are approximately equal to the resonant frequency, $\omega_T$, of the measurement resonator, thus changing a property (e.g., impedance) of the measurement resonator when the two qubit system undergoes Rabi oscillations. This property of the measurement resonator is then measured to achieve a readout on the two qubit system. If the property of the measurement resonator changes as a result of the suitable bias signal and the alternating signal, then the two qubit quantum system was in state |10> at the end of the quantum computation. If, on the other hand, the property of the measurement resonator does not change as a result of the suitable bias signal and alternating signal, then the two qubit quantum system was in state |00> at the end of the quantum computation.

As an example of the above readout scheme, Rabi oscillations are induced between state |10> and |01> to effect a readout. A control system is used to apply a bias signal and an alternating signal with a frequency approximately equal to $\omega_{01\text{-}10}$ in order to effect the desired Rabi oscillations. The amplitude of the alternating signal is also set so that the Rabi oscillation frequency, $\Omega_R$ is approximately equal to the resonant frequency of the measurement resonator, $\omega_T$. The initial state of the two-qubit system, $|\psi>=a|00>+b|10>$, becomes $|\psi>=a|00>+b\cdot RO(c|10>+d|01>)$, where RO( ) indicates that Rabi oscillations occur between the two states in the round brackets. If the measured property of the measurement resonator changes upon application of the suitable bias signal and alternating signal, then the two-qubit system was in state |10> at the end of the quantum computation. If, on the other hand, the measured property of the measurement resonator does not change upon application of the signal, then the two-qubit system was in state |00> at the end of the quantum computation.

Rabi oscillations can be induced between state |00> and a state other than state |10> in order to effect a readout. In other words, when the two qubit system is in an initial state $|\psi>=a|00>+b|10>$, a control mechanism can be used to apply an alternating signal and a bias signal to the two qubit system such that Rabi oscillations are induced between state |00> and a state other than state |10>. The control mechanism is set such that the frequency of the Rabi oscillations, $\Omega_R$, is approximately equal to the resonant frequency, $\omega_T$, of the measurement resonator, thus changing a property of the measurement resonator (e.g., impedance) when the two qubit system undergoes Rabi oscillations. This property of the measurement resonator is then measured to effect a readout on the two qubit system. If the property of the measurement resonator changes upon application of the alternating frequency, then the two qubit quantum system was in state |00> at the end of the quantum computation. If, on the other hand, the property of the measurement resonator is not affected by the application of the bias signal and alternating frequency provided by the control mechanism, the two qubit quantum system was in state |10> at the end of the quantum computation.

As an example of the above readout scheme, Rabi oscillations are induced between state |00> and |01> to effect a readout. A control system is used to apply a suitable bias signal and an alternating signal with a frequency approximately equal to $\omega_{00\text{-}01}$ to induce Rabi oscillations between the desired states. The control system is also set such that the Rabi oscillation frequency, $\Omega_R$, is approximately equal to the resonant frequency of the measurement resonator, $\omega_T$. The initial state $|\psi>$ of the two qubit system, $a|00>+b|10>$, will now become $a\cdot RO(c|00>+d|01>)+b|10>$, where RO( ) indicates that Rabi oscillations occur between the two states in the round brackets. If the measured property of the measurement resonator changes upon application of the alternating frequency and suitable DC bias, then the two qubit system was in state |00> at the end of the quantum calculation. If, on the other hand, the property of the measurement resonator is not affected by the application of the alternating frequency and suitable DC bias, then the two qubit system was in state |10> at the end of the quantum computation.

Entanglement Demonstration with Two Coupled Qubits

In one embodiment of the present invention, entanglement between two qubits is demonstrated or characterized. In this embodiment, each qubit has two basis states. In quantum mechanics, a two qubit entangled state is one that cannot be formed by multiplying two single qubit states together. For example $$|\psi\rangle = \frac{|00\rangle|10\rangle}{\sqrt{2}}$$

is not an entangled state, since it can be factored as $$|\psi\rangle = \left(\frac{|0\rangle_1 + |1\rangle_1}{\sqrt{2}}\right)|0\rangle_2,$$

where the kets with subscript one refers to the state of qubit one and the ket with subscript two refers to the state of qubit two. The two qubit entangled states of most interest are the four Bell states:

$$|\beta_{00}\rangle = \frac{|00\rangle + |11\rangle}{\sqrt{2}}, \quad |\beta_{01}\rangle = \frac{|01\rangle + |10\rangle}{\sqrt{2}},$$

$$|\beta_{10}\rangle = \frac{|00\rangle - |11\rangle}{\sqrt{2}}, \text{ and } |\beta_{11}\rangle = \frac{|01\rangle - |10\rangle}{\sqrt{2}}.$$

See, for example, Nielsen and Chuang, *Quantum Computation and Quantum Information*, Cambridge University Press, Cambridge England, 2000, which is hereby incorporated by reference in its entirety. The Bell states cannot be factored into single qubit states. In order to demonstrate entanglement between two qubits, the state of the two qubit quantum system is initialized to be an unequal superposition of the two basis states contained within a chosen Bell state. For example, to demonstrate entanglement similar to state $|\beta_{00}\rangle$ or state $|\beta_{10}\rangle$, the state of the two qubit quantum system is initialized with a component that includes a term proportional to a|00>+b|11>, where $|a|^2 \neq |b|^2$. In other words, the two qubit quantum system is initialized to any initial state a|00>+b|11>+c|01>+d|10> so long as at least one of a and b is nonzero and $|a|^2 \neq |b|^2$. Provided that |00> and |1> have different energies, this condition ensures that Rabi oscillations can occur between state |00> and state |11> since each state has different probability amplitudes associated with it.

Entanglement is demonstrated by inducing and measuring Rabi oscillations between the two basis states of the chosen Bell state. After the two qubit quantum system is initialized into an unequal superposition of the two subject basis states of a chosen Bell state, a control system is used to induce Rabi oscillations between these two basis states. The control system also controls the Rabi oscillation frequency, $\Omega_R$, such that it is approximately equal to the resonant frequency of the measurement resonator, $\omega_T$. The control system is also set such that the Rabi oscillations have a measurable affect on a property (e.g., impedance) of the measurement resonator. This property is monitored. A change in the property when the control system is used to induce Rabi oscillations between these two basis states of a chosen Bell state means that Rabi oscillations have been induced between the two basis states. This, in turn, means that the state of the two qubit quantum system has some component that is proportional to a coherent superposition of the two basis states of a chosen Bell state and that this portion of the state of the two qubit quantum system is entangled.

As an example of the above embodiment of the present invention, entanglement can be demonstrated in a two qubit quantum system by inducing Rabi oscillations between state |00> and state |11>, where there is a nonzero energy difference between the two states. In such a case, the two qubit quantum system is initialized into an unequal superposition of states |00> and |11>. In other words, the state of the two qubit quantum system is initialized to have a term proportional to a|00>+b|11>, where $|a|^2 \neq |b|^2$. The control system applies an alternating signal with frequency $\omega_{00-11}$ and a suitable bias signal, such that the frequency of the Rabi oscillations, $\Omega_R$, induced in the two qubit quantum system is approximately equal to the resonant frequency of the measurement resonator, $\omega_T$. The nature of the induced Rabi oscillations also serves to measurably change a property (e.g., impedance) of the measurement resonator. This property of the measurement resonator is monitored and if it changes while the alternating signal is being applied to the two qubit quantum system, then entanglement has been demonstrated for the two qubit quantum system.

Measuring One CBJJ Qubit Using a Second Coupled CBJJ Qubit

In accordance with an embodiment of the present invention, apparatus 600 (FIG. 6) can be used in a single qubit readout using an ancillary qubit. In this embodiment of the present invention, the CBJJ qubits only require two basis states per qubit, making quantum system 650 a four level quantum system. In this embodiment of the present invention, the basis states of quantum system 650 are |00>, |01>, |10>, and |1> with the left-most bit signifying the state of qubit 652-1 and the right-most bit signifying the state of qubit 652-2. As an example of this embodiment of the present invention, qubit 652-1 is treated as the computational qubit and qubit 652-2 is treated as the ancillary qubit. In an alternative example that is not described, qubit 652-2 can be used as the computational qubit and qubit 652-1 can be used as the ancillary qubit.

In the example, quantum system 650 is initialized to state |00> and quantum computations are performed on qubit 652-1 that brings quantum system 650 to a coherent superposition of states |00> and |10>, where |ψ>=a|00>+b|10> and $|a|^2+|b|^2=1$. Methods for performing quantum computations on two coupled CBJJ qubits are well known. See Blais et al., U.S. patent application Ser. No. 10/419,024, filed Apr. 17, 2003, which is hereby incorporated by reference in its entirety. Further still in the example, the state of quantum system 650 is measured. The process of measuring the quantum system collapses the superposition of states to either |00> or |10>. Thus, the state of qubit 652-1 is either |0> or |1>, depending on whether the state of quantum system 650 is |00> or |10>.

A readout operation comprises using control mechanism 230 to couple quantum system 650 to measurement resonator 110. Control mechanism 230 supplies a signal that induces Rabi oscillations between states |10> and a state other than state |00>. For example, Rabi oscillations can be induced between state |10> and state |01> by applying an alternating signal with frequency $\omega_{01\text{-}10}$ along with a suitable bias signal. The signal applied by control mechanism 230 is set so that the frequency of the Rabi oscillations, $\Omega_R$, is approximately equal to the resonance frequency of the measurement resonator, $\omega_T$. The signal applied by control mechanism 230 is also set so that the Rabi oscillations in quantum system 650 measurably affects a property (e.g., impedance) of measurement resonator 110. If a change in the property of measurement resonator 110 is measured, then quantum system 650 was in state |10> and qubit 652-1 was in state |1> at the end of the quantum computation. If no change in the property of measurement resonator is measured, then quantum system 650 was in state |00> and qubit 652-1 was in state |0> at the end of the quantum calculation.

In an alternate embodiment of the present invention, a readout comprises inducing Rabi oscillations between state |00> and a state other than state |10> in quantum system 650. In this instance, control mechanism 230 supplies an alternating signal that induces Rabi oscillations between states |00> and a state other than state |10>. For example, Rabi oscillations can be induced between state |00> and state |01> by applying an alternating signal with frequency cool. The amplitude of the alternating signal is set so that the frequency of the Rabi oscillations, $\Omega_R$, is approximately equal to the resonance frequency of the measurement resonator, $\omega_T$. The signal applied by control mechanism 230 is also set so that the Rabi oscillations in quantum system 650 measurably affect a property (e.g., impedance) of measurement resonator 110. If a change in the property of measurement resonator 110 is measured when the alternating signal is applied, then quantum system 650 was in state |00> and qubit 652-1 is in state |0> at the time of measurement. If, on the other hand, no change in the property of measurement resonator 110 is measured when the alternating signal is applied, then quantum system 650 is in state |10> and qubit 652-1 is in state |1> at the time of measurement.

Measuring One Three-Junction Flux Qubit Using a Second Coupled Three-Junction Flux Qubit Device 700 (FIG. 7) can be used in a single qubit readout using an ancillary qubit. In this embodiment of the present invention, the three-junction flux qubits only require two basis states per qubit, making quantum system 750 a four level quantum system. In this embodiment of the present invention, the basis states of quantum system 750 are |00>, |01>, |10>, and |1> with the left-most bit signifying the state of qubit 752-1 and the right-most bit signifying the state of qubit 752-2. As an example of this embodiment of the present invention, qubit 752-1 will be treated as the computational qubit and qubit 752-2 will be treated as the ancillary qubit. In an alternative example that is not described, qubit 752-2 is used as the computational qubit and qubit 752-1 is used as the ancillary qubit.

Before a readout is performed, quantum computations on qubit 752-1 are performed. Quantum system 750 is initialized into state |00> and then quantum computations are performed on qubit 752-1 which brings quantum system 750 to a coherent superposition of states |00> and |10>, where $|\psi\rangle = a|00\rangle + b|10\rangle$ and $|a|^2 + |b|^2 = 1$. Methods for performing quantum computations on two inductively coupled three-junction qubits are well known in the prior art. For example, see Mooij et al., which is hereby incorporated by reference in its entirety.

Next, a readout is performed on quantum system 750 to measure the state of qubit 752-1 by using control system 430 to couple quantum system 750 to measurement resonator 110. Control system 430 supplies a signal that induces Rabi oscillations between states |10> and a state other than state |00>. For example, Rabi oscillations can be induced between state |10> and state |01> by applying an alternating signal with frequency $\omega_{01\text{-}10}$ and a suitable bias signal. The amplitude of the alternating frequency applied by control system 430 is set so that the frequency of the Rabi oscillations, $\Omega_R$, is approximately equal to the resonance frequency of measurement resonator 110, $\omega_T$. The signal applied by control system 430 is also set so that the Rabi oscillations in quantum system 750 measurably affect a property (e.g. impedance) of measurement resonator 110. If a change in the property of measurement resonator 110 is measured when the alternating frequency is applied by control system 430, then quantum system 750 is in state |10> and qubit 752-1 is in state |1> at the time of measurement. On the other hand, if no change in the property of measurement resonator 110 is measured when the alternating frequency is applied, then quantum system 750 is in state |00> and qubit 752-1 in state |0> at the time of measurement.

In an alternate embodiment of the present invention, a readout can be affected by inducing Rabi oscillations between state |00> and a state other than state |10> in quantum system 750. In such embodiments, control system 430 supplies an alternating signal that induces Rabi oscillations between state |00> and a state other than state |10>. For example, Rabi oscillations can be induced between state |00> and state |01> by applying an alternating signal with frequency $\omega_{00\text{-}10}$. The signal applied by control system 430 is set so that the frequency of the Rabi oscillations, $\Omega_R$, is approximately equal to the resonance frequency of measurement resonator 110, $\omega_T$. The signal applied by control system 430 is also set so that the Rabi oscillations in quantum system 750 measurably affect a property (e.g., impedance) of measurement resonator 110. If a change in the property of measurement resonator 110 is measured when the alternating signal is applied, then quantum system 750 is in state |00> and qubit 752-1 is in state |0> at the time of measurement. If, on the other hand, no change in the property of measurement resonator 110 is measured when the alternating signal is applied, then quantum system 750 is in state |10> and qubit 752-1 is in state |1> at the time of measurement.

Figure 8:
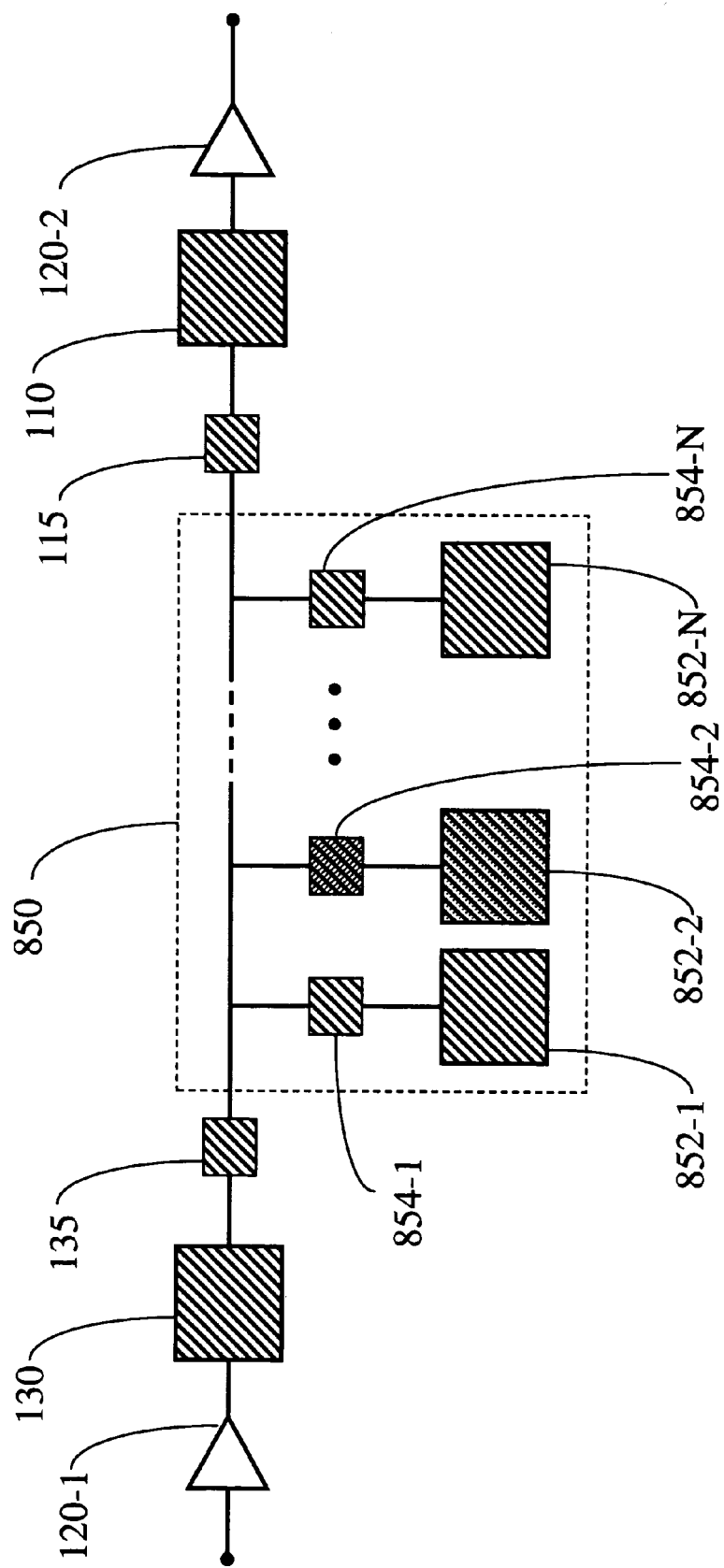
FIG. 8 illustrates an array of N qubits, where N is a positive integer, in accordance with one embodiment of the present invention.

Measuring the State of a Qubit in an Array of Qubits with Three Basis States Each In another embodiment of the present invention, the state of a selected qubit in an array of qubits can be measured using conditional Rabi oscillations. FIG. 8 illustrates an array 850 that has N qubits 852, where N is a positive integer. In some embodiments, N is two or more, between 2 and 10, between 2 and 1000 or less than 10,000. In some embodiments of the present invention, qubit array 850 comprises superconducting qubits, such as a charge, flux, phase or hybrid qubits. FIG. 8 also illustrates a control system 130 and an input device 120-1 that are used to apply signals to qubit array 850. Control system 130 applies signals to qubit array 850 through connection 135. FIG. 8 also illustrates measurement resonator 110, signal output device 120-2 and connection 115. Connection 115 connects measurement resonator 110 to qubit array 850. Each qubit 852 in array 850 is connected to the rest of the system by a corresponding connection 854. In order to read out one qubit at a time, each qubit 852 in qubit array 850 has at least three basis states.

In accordance with an embodiment of the present invention, quantum computations are performed on each qubit 852 of qubit array 850 prior to reading out their states. Qubit array 850 is initialized to state $|0_1 0_2 \ldots 0_N\rangle$. Quantum computations are then performed on the qubits such that the state of qubit array 850 evolves to be, $$|\psi\rangle = \sum_{i=0}^{2^N-1} c_i |b_i\rangle$$

where $b_i$ is the binary representation of the number i. Qubit array 850 represents a quantum system where the state of a qubit 852 in qubit array 850 can be measured, thereby collapsing at least a portion of the quantum state of the quantum system.

A readout is performed on a qubit 852 in qubit array 850 by inducing Rabi oscillations between two states of the qubit being measured. The case where qubit 852-1 is read out will be described in order to illustrate the method. Rabi oscillations are induced between state $|2\rangle$ and a state $|\phi\rangle$, other than state $|2\rangle$, of qubit 852-1. In this example, Rabi oscillations between states $|2\rangle$ and $|1\rangle$ of qubit 852-1 are discussed.

Rabi oscillations can be induced in a predetermined qubit 852 in qubit array 850 without inducing Rabi oscillations in any other qubits in the array. This is accomplished by ensuring that the predetermined qubit 852 is not coupled to any other qubit 852 in qubit array 850 and that the frequency required to induce Rabi oscillations in the predetermined qubit 852 is significantly different than the frequency required to induce Rabi oscillations in any other qubit 852 in the system. In a typical embodiment of the present invention, the number of qubits 852 in qubit array 850 is limited by the requirement that Rabi oscillations can be induced in the predetermined qubit without inducing Rabi oscillations in any of the remaining qubits 852 in qubit array 850.

In one an embodiment of the present invention, the state of qubit 852-1 is measured by inducing Rabi oscillations between states $|2\rangle$ and $|1\rangle$ of qubit 852-1. Control mechanism 230 applies an alternating signal to qubit 852-1 and an optional bias signal such that Rabi oscillations are induced between states $|2\rangle$ and $|1\rangle$ of qubit 852-1. The alternating signal applied by control mechanism 230 is set so that the frequency of Rabi oscillations, $\Omega_R$, is approximately equal to the resonant frequency of measurement resonator 110, $\omega_T$. Control system 130 is also set such that the Rabi oscillations measurably affect a property (e.g., impedance) of measurement resonator 110. This property of measurement resonator 110 is monitored when the signal is applied by control system 130 to determine the state of qubit 852-1. If the property of measurement resonator 110 changes when the signal is applied, then qubit 852-1 was in state $|1\rangle$ at the time of measurement. If, on the other hand, the property of measurement resonator 110 does not change, then qubit 852-1 is in state $|0\rangle$ at the time of measurement. Measurement of other qubits 852 in qubit array 850 can be performed after the state of qubit 852-1 has been measured.

All references cited herein are incorporated herein by reference in their entirety and for all purposes to the same extent as if each individual publication or patent or patent application was specifically and individually indicated to be incorporated by reference in its entirety for all purposes.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

What is claimed:

1. A method for determining whether a first state of a quantum system is occupied, the method comprising:
    (A) applying a signal to the quantum system at a frequency that corresponds to an energy level separation between said first state and a second state of said quantum system, wherein
        (i) said quantum system produces a readout frequency when said first state is occupied at a time when said signal is applied, and
        (ii) said quantum system does not produce said readout frequency when said first state is not occupied at the time when said signal is applied; and
    (B) measuring a property of a measurement resonator that is conditionally coupled to the quantum system when said quantum system produces said readout frequency, thereby determining whether said first state of said quantum system is occupied.

2. The method of claim 1, wherein said measurement resonator is capacitively or inductively coupled to said quantum system when said quantum system produces said readout frequency.

3. The method of claim 1, wherein the energy level separation between said first state and said second state is between 400 megaHertz (MHz) and 50 gigahertz (GHz).

4. The method of claim 1, wherein said signal comprises an alternating signal.

5. The method of claim 1, wherein said signal comprises an alternating signal and a DC bias signal.

6. The method of claim 1, wherein said signal comprises an alternating current, an alternating voltage, or an alternating magnetic field.

7. The method of claim 1, wherein the readout frequency is between 1 MHz and 400 MHz.

8. The method of claim 1, wherein the readout frequency is adjusted from a first frequency to a second frequency by changing an amplitude of the signal from a first amplitude to a second amplitude.

9. The method of claim 1, wherein the quantum system is not coupled to the measurement resonator when the quantum system does not produce the readout frequency.

10. The method of claim 1, wherein said property of said measurement resonator is the impedance of the measurement resonator.

11. The method of claim 1, wherein (i) said measurement resonator is capacitively or inductively coupled to the quantum system when said quantum system produces said readout frequency and (ii) is not capacitively or inductively coupled to the quantum system when said quantum system does not produce said readout frequency, and
    the property of the measurement resonator is determined by the presence or absence of coupling between the quantum system and the measurement resonator.

12. The method of claim 1, wherein the measurement resonator has a characteristic resonance $\omega_T$.

13. The method of claim 12, wherein the readout frequency resonates with the characteristic resonance $\omega_T$ of the measurement resonator.

14. The method of claim 1 wherein the quantum system is a qubit having a first energy level, a second energy level, and a third energy level, and wherein said first energy level and said second energy level respectively correspond to a first basis state and a second basis state of said qubit, and wherein said first state is said first basis state or said second basis state of said qubit, and said second state is said third energy level of said qubit, and wherein said qubit produces said readout frequency when:
  (i) said signal has a frequency that corresponds to an energy level separation between said first state of the qubit and said second state of the qubit, and
  (ii) at least one of said first state of the qubit and said third energy level of the qubit is occupied at a time when said signal is applied.

15. The method of claim 14, wherein an energy separation between the first basis state of the qubit and the third energy level of the qubit is different from an energy separation between the second basis state of the qubit and the third energy level of the qubit.

16. The method of claim 15, wherein the frequency of the signal corresponds to the energy level separation between the second basis state of the qubit and the third energy level of the qubit and wherein:
  (i) an absence of said readout frequency when the driving signal is applied indicates that the qubit occupies the first basis state; and
  (ii) a presence of said readout frequency when the driving signal is applied indicates that the qubit occupies the second basis state.

17. The method of claim 15, wherein the frequency of the driving signal corresponds to the energy level separation between the first basis state of the qubit and the third energy level of the qubit and wherein:
  (i) an absence of said readout frequency when the driving signal is applied indicates that the qubit occupies the second basis state; and
  (ii) a presence of said readout frequency when the driving signal is applied indicates that the qubit occupies the first basis state.

18. The method of claim 14, wherein the qubit is a charge qubit, a hybrid qubit, a phase qubit, or a flux qubit.

19. The method of claim 14, wherein the qubit is a current biased Josephson junction qubit.

20. The method of claim 14, further comprising biasing the qubit away from a degeneracy point prior to said applying step (A).

21. A structure for detecting a state of a first qubit, comprising:
  (a) a quantum system that comprises:
    (i) said first qubit, wherein the first qubit has a first basis state and a second basis state; and
    (ii) an ancillary qubit having an ancillary quantum state that can be coupled to the first basis state or the second basis state of said first qubit;
  (b) a measurement resonator that is configured to couple to Rabi oscillations between (i) one of the first basis state and the second basis state of said first qubit and (ii) the ancillary state of the ancillary qubit; and
  (c) a control mechanism for applying a driving signal to the quantum system that is equivalent to an energy difference between (i) one of said first basis state and said second basis state of said first qubit and (ii) the ancillary quantum state of said ancillary qubit.

22. The structure of claim 21, wherein the first qubit is a superconducting qubit.

23. The structure of claim 22, wherein the superconducting qubit is a flux qubit, a charge qubit, a phase qubit, or a hybrid qubit.

24. The structure of claim 21, wherein the measurement resonator comprises an effective inductance and an effective capacitance.

25. The structure of claim 24, wherein the effective inductance is made of a superconducting material.

26. The structure of claim 21 wherein said quantum system, said measurement resonator, and said control mechanism are integrated on a common substrate.

27. The structure of claim 21, wherein said measurement resonator comprises a first component and a second component and wherein
  said quantum system, said first component of said measurement resonator, and said coupling mechanism are integrated on a common substrate, and
  said second component of said measurement resonator is not integrated on said common substrate.

28. The structure of claim 27, wherein said first component of said measurement resonator is a superconducting inductor and said second component of said measurement resonator comprises a capacitance.

29. The structure of claim 24, wherein the effective inductance is between 70 pico-Henry (pH) and 14 micro-Henry (µH).

30. The structure of claim 24, wherein the effective capacitance is between 70 femto-Farads (fF) and 140 pico-Farads (pF).

31. The structure of claim 21, wherein the measurement resonator has a quality factor between 1000 and 3000.

32. The structure of claim 21, wherein a characteristic resonance frequency of the measurement resonator is between 0.5 megahertz (MHz) and 1,000 MHz.

33. The structure of claim 21, the structure further comprising a readout mechanism for measuring a property of the measurement resonator wherein said quantum system, said measurement resonator, said control mechanism and said readout mechanism are integrated on a common substrate.

34. The structure of claim 33, wherein said property is an impedance of the measurement resonator.

35. The structure of claim 21, wherein said driving signal is an alternating current having a frequency between 400 MHz and 50 GHz.

36. The structure of claim 21 wherein an operating temperature of said quantum system is less than 1 Kelvin.

37. The structure of claim 21 wherein an operating temperature of said quantum system is less than 100 milli-Kelvin.

38. The structure of claim 27 wherein said common substrate is oxidized silicon.

39. The structure of claim 21 wherein the driving signal is configured to induce Rabi oscillations between (i) one of the first basis state or the second basis state of the first qubit, and (ii) the ancillary quantum state of the ancillary qubit.

40. The structure of claim 39, wherein the control mechanism controls the frequency of the Rabi oscillations.

41. The structure of claim 21 wherein the driving signal is an alternating signal.

42. The structure of claim 41 wherein the control mechanism optionally further applies a DC bias signal.

43. The structure of claim 21 wherein the driving signal is a current.

44. The structure of claim 21 wherein the driving signal is a voltage.

45. The structure of claim 21 wherein the driving signal ia a magnetic field.

46. The structure of claim 21 wherein the first qubit and the ancillary qubit are the same qubit and the ancillary quantum state is a state other than the first basis state or the second basis state.

47. The structure of claim 21 wherein the first qubit and the ancillary qubit are different qubits.

* * * * *